US012406289B2

(12) United States Patent
Fuchs et al.

(10) Patent No.: US 12,406,289 B2
(45) Date of Patent: Sep. 2, 2025

(54) TECHNIQUES FOR AUTOMATIC FILLING OF AN INPUT FORM TO GENERATE A LISTING

(71) Applicant: eBay Inc., San Jose, CA (US)

(72) Inventors: Gilad Eliyhau Fuchs, Kfar Saba (IL); Haggai Roitman, Yokneam Ilit (IL); Matan Mandelbrod, Pardes Hana (IL)

(73) Assignee: EBAY INC., San Jose, CA (US)

( * ) Notice: Subject to any disclaimer, the term of this patent is extended or adjusted under 35 U.S.C. 154(b) by 40 days.

(21) Appl. No.: 17/752,652

(22) Filed: May 24, 2022

(65) Prior Publication Data

US 2023/0385887 A1  Nov. 30, 2023

(51) Int. Cl.
| | |
|---|---|
| *G06Q 30/0601* | (2023.01) |
| *G06F 16/958* | (2019.01) |
| *G06F 40/174* | (2020.01) |
| *G06F 40/205* | (2020.01) |
| *G06F 40/284* | (2020.01) |
| *G06N 3/044* | (2023.01) |
| *G06N 3/0464* | (2023.01) |
| *G06N 7/01* | (2023.01) |
| *G06N 20/00* | (2019.01) |

(52) U.S. Cl.
CPC ....... *G06Q 30/0603* (2013.01); *G06F 40/174* (2020.01); *G06F 40/205* (2020.01); *G06F 40/284* (2020.01); *G06N 7/01* (2023.01)

(58) Field of Classification Search
None
See application file for complete search history.

(56) References Cited

U.S. PATENT DOCUMENTS 10,942,967 B1 * 3/2021 Biessmann ............ G06N 20/10
11,055,557 B2    7/2021 Chatterjee et al.
(Continued)

FOREIGN PATENT DOCUMENTS

CN   117112775   11/2023

OTHER PUBLICATIONS

Charron et al., "Extracting Semantic Information for e-Commerce", The Semantic Web—ISWC 2016, Lecture Notes in Computer Science (LNISA) vol. 9982, first online Sep. 23, 2016, Springer, Cham. https://doi.org/10.1007/978-3-319-46547-0_27, pp. 273-290.

(Continued)

*Primary Examiner* — Mustafa A Amin
(74) *Attorney, Agent, or Firm* — SCHWEGMAN LUNDBERG & WOESSNER, P.A.

(57) ABSTRACT

A system may receive, via a user interface associated with an online marketplace, a request to generate the listing for the item, the request including a natural language text input as a title for the listing. The system may generate, based on inputting the natural language text to a transformer-based machine learning model, a predicted value for an item description attribute of the item. In some examples, a value of the item description attribute may be unspecified in the natural language text and may describe a feature associated with the item as produced. The system may then cause presentation, via the user interface associated with the online marketplace, of the listing including the predicted value for the item description attribute.

20 Claims, 11 Drawing Sheets

(56) References Cited

U.S. PATENT DOCUMENTS

| | | | |
|---|---|---|---|
| 2010/0023536 A1* | 1/2010 | Lee ..................... | G06F 40/274 |
| | | | 714/48 |
| 2018/0101893 A1* | 4/2018 | Dagan ................ | G06Q 30/0641 |
| 2019/0303985 A1 | 10/2019 | Wouk | |
| 2019/0311301 A1* | 10/2019 | Pyati ..................... | G06F 16/901 |
| 2020/0034754 A1* | 1/2020 | Fortini ............... | G06Q 30/0641 |
| 2020/0380584 A1* | 12/2020 | Mozzami ........... | G06Q 30/0633 |
| 2021/0201373 A1 | 7/2021 | Trinh et al. | |
| 2022/0067571 A1 | 3/2022 | Lagerling et al. | |
| 2022/0374955 A1* | 11/2022 | Ulammandakh .. | G06Q 30/0603 |
| 2023/0104662 A1* | 4/2023 | Fatemi ................. | G06F 40/279 |
| | | | 704/9 |

OTHER PUBLICATIONS

Clark et al., "ELECTRA: Pre-training Text Encoders as Discriminators Rather Than Generators", The International Conference on Learning Representations 2020 (ICLR 2020), arXiv:2003.10555v1 [cs.CL] Mar. 23, 2020, 18 pages.

Cortez et al., "ONDUX: On-Demand Unsupervised Learning for Information Extraction", SIGMOD '10: Proceedings of the 2010 ACM SIGMOD International Conference on Management of Data, Jun. 2010, https://doi.org/10.1145/1807167.1807254, pp. 807-818.

De Bakker et al., "A Hybrid Model Words-Driven Approach for Web Product Duplicate Detection", CAiSE 2013: Advanced Information Systems Engineering, Lecture Notes in Computer Science (LNISA), vol. 7908, Springer, Berlin, Heidelberg, https://doi.org/10.1007/978-3-642-38709-8_10, pp. 149-161.

Devlin et al., "BERT: Pre-training of Deep Bidirectional Transformers for Language Understanding", arXiv:1810.04805v1 [cs.CL] Oct. 11, 2018, 14pgs.

Ghani et al. "Text Mining for Product Attribute Extraction", ACM SIGKDD Explorations Newsletter, vol. 8, issue 1, Jun. 2006, https://doi.org/10.1145/1147234.1147241, pp. 41-48.

Joshi et al., "Distributed Word Representations Improve NER for e-Commerce", Proceedings of the 1st Workshop on Vector Space Modeling for Natural Language Processing, Association for Computational Linguistics 2015, https://doi.org/10.3115/v1/W15-1522, pp. 160-167.

Kannan et al., "Matching Unstructured Product Offers to Structured Product Specifications", Proceedings of the 17th ACM SIGKDD International Conference on Knowledge Discovery and Data Mining 2011 (KDD '11), Association for Computing Machinery, New York, NY, USA, https://doi.org/10.1145/2020408.2020474, pp. 404-412.

Kingma et al., "ADAM: A Method for Stochastic Optimization", arXiv:1412.6980v9 [cs.LG] Jan. 30, 2017, 15 pages.

Kristjansson et al., "Interactive Information Extraction with Constrained Conditional Random Fields", Proceedings of the 19th National Conference on Artificial Intelligence 2004 (AAAI'04), Jul. 2004, pp. 412-418.

Majumder et al., "Deep Recurrent Neural Networks for Product Attribute Extraction in eCommerce", arXiv:1803.11284v1 [cs.CL] Mar. 29, 2018, 7 pages.

Melli, "Shallow Semantic Parsing of Product Offering Titles (for Better Automatic Hyperlink Insertion)", KDD '14: Proceedings of the 20th ACM SIGKDD International Conference on Knowledge Discovery and Data Mining, Aug. 2014, https:/doi.org/10.1145/2623330.2623343, pp. 1670-1678.

More, "Attribute Extraction from Product Titles in eCommerce", arXiv:1608.04670v1 [cs.CL] Aug. 15, 2016, 10 pages.

Petrovski et al., "Learning Regular Expressions for the Extraction of Product Attributes from E-Commerce Microdata", LD4IE'14: Proceedings of the Second International Conference on Linked Data for Information Extraction, vol. 1267, Oct. 2014, pp. 45-54.

Petrovski et al., "Extracting Attribute-Value Pairs from Product Specifications on the Web", WI '17: Proceedings of the International Conference on Web Intelligence, Aug. 2017, https://doi.org/10.1145/3106426.3106449, pp. 558-565.

Ristoski et al., "Enriching Product Ads with Metadata from HTML Annotations" Proceedings of the 13th International Conference on the Semantic Web, Latest Advances and New Domains—vol. 9678, May 2016, https://doi.org/10.1007/978-3-319-34129-3_10, pp. 151-167.

Sun et al., "ERNIE: Enhanced Representation through Knowledge Integration", arXiv:1904.09223v1 [cs.CL] Apr. 19, 2019, 8 pages.

Toda et al., "A Probabilistic Approach for Automatically Filling Form-Based Web Interfaces", Proceedings of the VLDB Endowment, vol. 4, Issue 3, Dec. 2010, https://doi.org/10.14778/1929861.1929862, pp. 151-160.

Vaswani et al., "Attention is All You Need", NIPS'17: Proceedings of the 31st International Conference on Neural Information Processing Systems, Dec. 2017, 11 pages.

Wu et al., "Google's Neural Machine Translation System: Bridging the Gap between Human and Machine Translation", arXiv:1609.08144v2 [cs.CL] Oct. 8, 2016, 23 pages.

"European Application Serial No. 23174054.9, Extended European Search Report mailed Oct. 31, 2023", 10 pgs.

Fuchs, Gilad, "Automatic Form Filling with Form-BERT", Proceedings Of The 13th ACM Sigplan International Symposium On Haskell, Acmpub27, New York, NY, USA, (Jul. 11, 2021), 1850-1854, total pp. 5.

* cited by examiner

TECHNIQUES FOR AUTOMATIC FILLING OF AN INPUT FORM TO GENERATE A LISTING

FIELD OF TECHNOLOGY

The present disclosure relates generally to database systems and data processing, and more specifically to techniques for automatic filling of an input form to generate a listing.

BACKGROUND

Computer networks permit the transport of data between interconnected computers. Search engine technology permits a user to obtain information from a vast array of sources available via a computer network. A search engine may be a program that searches for and identifies content in a database that correspond to keywords or characters input by the user, and may return websites available via the Internet based on the search. To generate a search, a user may interact with a user device, such as a computer or mobile phone, to submit a search query via a search engine. The search engine may execute the search and display results for the search query based on communication with other applications and servers. Digital forms are commonly used for collecting structured information from users. In some cases, filling digital forms that include a large number of fields may be tedious and error-prone. Specifically, as digital forms are used to garner information for generating listings, accurate text summarization is becoming relevant for search engines, e-Commerce websites, news websites, social-networking websites, and so forth. Techniques for efficiently auto-filling an online form for generating a listing are therefore desired.

SUMMARY

A method for generating a listing for an item is described. The method may include receiving, via a user interface associated with an online marketplace, a request to generate the listing for the item, the request including a natural language text input as a title for the listing, generating, based on inputting the natural language text to a transformer-based machine learning model, a predicted value for an item description attribute of the item, where a value of the item description attribute is unspecified in the natural language text and describes a feature associated with the item as produced, and causing presentation, via the user interface associated with the online marketplace, of the listing including the predicted value for the item description attribute.

An apparatus for generating a listing for an item is described. The apparatus may include a processor, memory coupled with the processor, and instructions stored in the memory. The instructions may be executable by the processor to cause the apparatus to receive, via a user interface associated with an online marketplace, a request to generate the listing for the item, the request including a natural language text input as a title for the listing, generate, based on inputting the natural language text to a transformer-based machine learning model, a predicted value for an item description attribute of the item, where a value of the item description attribute is unspecified in the natural language text and describes a feature associated with the item as produced, and cause presentation, via the user interface associated with the online marketplace, of the listing including the predicted value for the item description attribute.

Another apparatus for generating a listing for an item is described. The apparatus may include means for receiving, via a user interface associated with an online marketplace, a request to generate the listing for the item, the request including a natural language text input as a title for the listing, means for generating, based on inputting the natural language text to a transformer-based machine learning model, a predicted value for an item description attribute of the item, where a value of the item description attribute is unspecified in the natural language text and describes a feature associated with the item as produced, and means for causing presentation, via the user interface associated with the online marketplace, of the listing including the predicted value for the item description attribute.

A non-transitory computer-readable medium storing code for generating a listing for an item is described. The code may include instructions executable by a processor to receive, via a user interface associated with an online marketplace, a request to generate the listing for the item, the request including a natural language text input as a title for the listing, generate, based on inputting the natural language text to a transformer-based machine learning model, a predicted value for an item description attribute of the item, where a value of the item description attribute is unspecified in the natural language text and describes a feature associated with the item as produced, and cause presentation, via the user interface associated with the online marketplace, of the listing including the predicted value for the item description attribute.

In some examples of the method, apparatuses, and non-transitory computer-readable medium described herein, generating the predicted value may include operations, features, means, or instructions for parsing the natural language text to generate a title token, identifying an attribute token of the transformer-based machine learning model associated with the item in which an attribute value may be unspecified in the natural language text based on the title token, and applying the transformer-based machine learning model to generate the predicted value for the item description attribute based on a set of title tokens and the attribute token.

Some examples of the method, apparatuses, and non-transitory computer-readable medium described herein may further include operations, features, means, or instructions for causing presentation, via the user interface, of the predicted value for the item description attribute in a listing creation form based on determining that the predicted value for the item description attribute satisfies a probability threshold.

Some examples of the method, apparatuses, and non-transitory computer-readable medium described herein may further include operations, features, means, or instructions for receiving, via the user interface, an indication confirming or disagreeing with the predicted value for the item description attribute and updating a probability value associated with the item description attribute based on the indication.

Some examples of the method, apparatuses, and non-transitory computer-readable medium described herein may further include operations, features, means, or instructions for generating, based on the transformer-based machine learning model, a second predicted value for a second attribute of the item based on the indication.

In some examples of the method, apparatuses, and non-transitory computer-readable medium described herein, inputting, to the transformer-based machine learning model, an indication of an attribute field token for the listing, masking one or more of attribute field values corresponding to the attribute field token, and training the transformer-based machine learning model to predict an attribute field value based on the attribute field token and natural language training text sample.

In some examples of the method, apparatuses, and non-transitory computer-readable medium described herein, the request to generate the listing for the item may be received as an input to a digital form displayed on the user interface.

DETAILED DESCRIPTION

Figure 1:
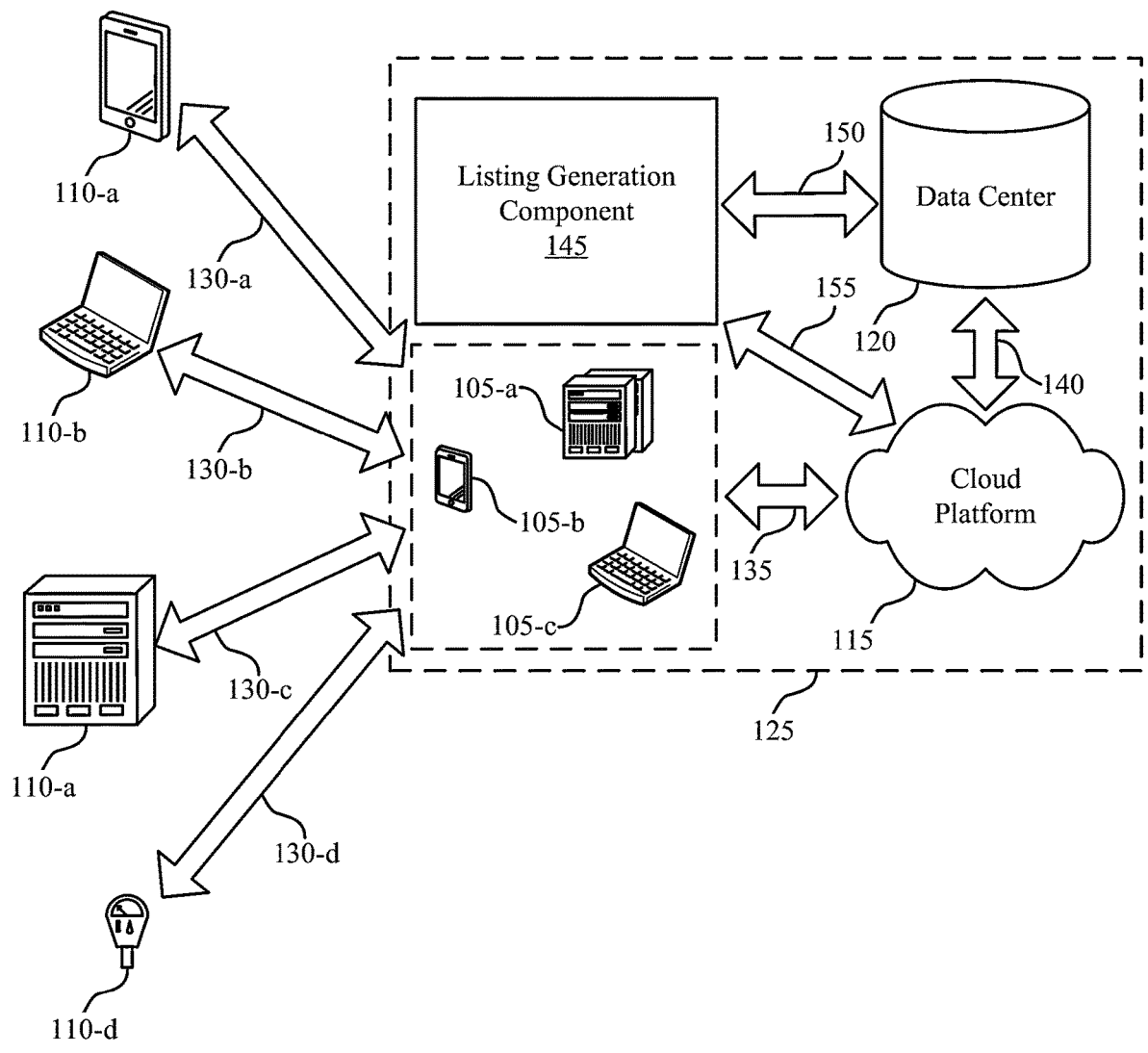
FIG. 1 illustrates an example of a generating a listing for an item system that supports techniques for automatic filling of an input form to generate a listing in accordance with aspects of the present disclosure.

A platform of an online marketplace often permits sellers to provide a description of an item being listed for sale. An item may refer to a product with a particular set of unique properties. When a prospective buyer initiates a product search, the platform (e.g., a search platform) of the online marketplace identifies a set of item listings that match the product search, and transfers the listings of the items available for sale for presentation to the prospective buyer. A browser may present to the seller, a digital form for inputting attributes related to a listing.

Digital forms are commonly used for collecting structured information from users. However, filling digital forms that include a large number of fields may be tedious and error-prone. An online ecommerce platform may often utilize many forms to gather user information. Online ecommerce marketplaces utilize such forms to collect attributes of items being listed for sale. The seller may provide a title for the listing and select one or more attributes of an item from drop down menus when creating the listing. For example, the seller (e.g., user) may select drop down menus indicating color, model, size, manufacturer, year, or the like, when creating a listing. However, some listing creation techniques may not be able to predict values for attributes based on a seller provided title for an item.

One or more techniques described herein provide a process for automatically predicting attribute values for auto-filling an online form (e.g., digital form) for generating a listing in an online marketplace based on natural language text input by a seller as a title for the listing. In particular, using such an approach, sellers may input natural language text as a title for the item being listed for sale. The natural language text may be sequence of text that includes one or more words, one or more phrases, one or more acronyms, one or more numbers, or the like. In some examples, the natural language text may not specify values for each attribute for creating the listing. The system described herein applies a transformer-based machine learning model that has been trained using natural language text sequences to predict values for one or more attributes of an item for creating a listing that were not previously specified by the user in the input natural language text. During training, the transformer-based machine learning model may be trained to predict a given attribute value that is unspecified in input natural language text by masking the attribute value during training time and encouraging the model to predict a correct value for the attribute value.

After training, the transformer-based machine learning model may receive a listing title from the seller as an input and predicts values for one or more listing attributes of an item that were not included in the title provided by the seller. Upon receiving the natural language text, the transformer-based machine learning model may parse the natural language text to generate tokens corresponding to words in the natural language text. In one example, upon receiving a natural language text, the transformer-based machine learning model may generate tokens "title 1," "title 2," "title 3," and "title 4" that correspond to respective words in the natural language text. The transformer-based machine learning model may predict the value of a given attribute of the listing using the tokens generated from the natural language text. For example, the transformer-based machine learning model may predict the value (value 1) for the token attribute "field 1" based on tokens "title 1," "title 2," "title 3," and "title 4." The transformer-based machine learning model may process both ordered input (i.e., listing title) and unordered input (set of attribute name-value pairs). In some examples, the transformer-based machine learning model may generate predicted values for one or more attributes and may automatically fill an input digital form using the predicted values to assist the seller with creating the listing. In one example, a seller may provide the listing title "Pokemon Pikachu VMAX 188/185 Vivid Voltage Gold Metal", and the transformer-based machine learning model may predict attribute values which are not explicitly mentioned in the title (e.g., "Manufacturer: Nintendo" and "Language: English").

The transformer-based machine learning model can be further used iteratively to leverage information provided by the seller with regards to a first predicted attributes value as the form filling progresses to refine predictions for other predicted attribute values. For example, if a user confirms that an auto-filled value is correct or incorrect, then the transformer-based machine learning model may use that information to keep or change a predicted value for a different attribute. As such, the techniques described herein may be used to predict values for attributes of an item based on a seller-provided natural language title for auto-populating a form to assist a seller in creating a listing for the item in an online marketplace.

Aspects of the disclosure are initially described in the context of an environment supporting an on-demand database service. Aspects of the disclosure are then described in the context of an application flow and a user interface. Aspects of the disclosure are further illustrated by and described with reference to apparatus diagrams, system diagrams, and flowcharts that relate to techniques for automatic filling of an input form to generate a listing.

FIG. 1 illustrates an example of a system 100 for cloud computing that supports techniques for automatic filling of an input form to generate a listing in accordance with various aspects of the present disclosure. The system 100 includes cloud clients 105, user devices 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a computing device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be part of a business, an enterprise, a non-profit, a startup, or any other organization type.

A cloud client 105 may facilitate communication between the data center 120 and one or multiple user devices 110 to implement an online marketplace. The network connection 130 may include communications, opportunities, purchases, sales, or any other interaction between a cloud client 105 and a user device 110. A cloud client 105 may access cloud platform 115 to store, manage, and process the data communicated via one or more network connections 130. In some cases, the cloud client 105 may have an associated security or permission level. A cloud client 105 may have access to some applications, data, and database information within cloud platform 115 based on the associated security or permission level, and may not have access to others.

The user device 110 may interact with the cloud client 105 over network connection 130. The network may implement transfer control protocol and internet protocol (TCP/IP), such as the Internet, or may implement other network protocols. The network connection 130 may facilitate transport of data via email, web, text messages, mail, or any other appropriate form of electronic interaction (e.g., network connections 130-a, 130-b, 130-c, and 130-d) via a computer network. In an example, the user device 110 may be computing device such as a smartphone 110-a, a laptop 110-b, and also may be a server 110-c or a sensor 110-d. In other cases, the user device 110 may be another computing system. In some cases, the user device 110 may be operated by a user or group of users. The user or group of users may be a customer, associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support an online application. This may include support for sales between buyers and sellers operating user devices 110, service, marketing of products posted by buyers, community interactions between buyers and sellers, analytics, such as user-interaction metrics, applications (e.g., computer vision and machine learning), and the Internet of Things. Cloud platform 115 may receive data associated with generation of an online marketplace from the cloud client 105 over network connection 135, and may store and analyze the data. In some cases, cloud platform 115 may receive data directly from a user device 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or via network connection 130 between a user device 110 and the cloud client 105. Data center 120 may utilize multiple redundancies for security purposes. In some cases, the data stored at data center 120 may be backed up by copies of the data at a different data center (not pictured).

Server system 125 may include cloud clients 105, cloud platform 115, listing generation component 145, and data center 120 that may coordinate with cloud platform 115 and data center 120 to implement an online marketplace. In some cases, data processing may occur at any of the components of server system 125, or at a combination of these components. In some cases, servers may perform the data processing. The servers may be a cloud client 105 or located at data center 120.

The listing generation component 145 may communicate with cloud platform 115 via connection 155, and may also communicate with data center 120 via connection 150. The listing generation component 145 may receive signals and inputs from user device 110 via cloud clients 105 and via cloud platform 115 or data center 120.

Online marketplaces enable sellers to present items for selling to potential buyers. The details describing each item on sale are commonly organized in a dedicated page, known as the listing page. A listing page may include information such as the item title, price, shipping details, image and various attributes, such as color, model, size, etc. Such information is collected from the seller using a digital form. For some listings a unique product identifier may exist, which allows for collection of accurate information on listings from a predefined catalog. Yet, for many product categories (such as collectible items like stamps or sports cards), a unique identifier quite often may not exist. For such cases, the digital form usually includes a free-text input-box for listing title and description and multiple fields with a closed set of values to collect structured listing attributes. An example of such a form may be included in a mobile application listing flow for an online marketplace.

Some systems may implement an online marketplace where a listing is displayed using a seller inputted description. Often times, the description provided by a seller includes long verbose sentences. In some cases, sellers and buyers may interact with such an online marketplace using a mobile device via a software applications. Specifically, sellers may list a product using the software application. The seller may utilize a digital form to generate the listing. However, it may be challenging for the seller to input long descriptions of a product via an application (using a digital form) on the screen of a mobile device used by the seller. Thus, efficient listing techniques may be desired.

Collecting an accurate and complete list of attribute name-value pairs per listing is highly valuable for multiple downstream tasks in online marketplaces. Among other usages, an online marketplace may use one or more attribute name-value pairs to show potential buyers structured and clear information on each listing. Such pairs also allow to filter users' search results and are highly valuable for improving multiple back-end tasks such as catalog and product recommendations. However, the process of filling a large number of attributes (may include up to tens of attributes in some categories) is tedious and often leads to low filling rates. For efficient listing of items, an automatic suggestion of attribute values may result in improving sellers' experience, and allowing to collect more attribute values per listing.

According to one or more aspects depicted herein, the system 100 implements procedures and techniques for automatically filling of an input form using artificial intelligence models. Specifically, server system 125 may include operations similar to those as described herein. One or more components of server system 125, including listing generation component 145, as described herein, may operate to generate a listing for a product. The listing generation component 145 within server system 125 may receive, via a user interface associated with an online marketplace, a request to generate the listing for the item, the request comprising a natural language text input as a title for the listing. The listing generation component 145 within server system 125 may generate, based on inputting the natural language text to a transformer-based machine learning model, a predicted value for an item description attribute of the item. In some examples, a value of the item description attribute may be unspecified in the natural language text input by the user and may describe a feature associated with the item as produced. A feature associated with the item as produced may include, for example, one or more of manufacturer information, year produced, manufacturer name, product type, product category, product specification, brand, product color, product size, weight, model name, material, version, part number, product dimensions, a product characteristic, or any combination thereof. The server system 125 and listing generation component 145 may then cause presentation, via the user interface associated with the online marketplace, of the listing including the predicted value for the item description attribute.

Techniques depicted herein may be implemented to ease sellers' process of filling out listing attributes during listing creation. Given seller's free-text input (i.e., listing title), the techniques of the present disclosure may be implemented to predict a set of values of a predefined set of attributes. Additionally, in case some attributes are explicitly provided by the seller (e.g., the seller has approved the first set of auto-filled values), the present disclosure provides for leveraging such additional input to predict other relevant attributes to recommend to the seller.

It should be appreciated by a person skilled in the art that one or more aspects of the disclosure may be implemented in a system 100 to additionally or alternatively solve other problems than those described herein. Further, aspects of the disclosure may provide technical improvements to "conventional" systems or processes as described herein. However, the description and appended drawings include example technical improvements resulting from implementing aspects of the disclosure, and accordingly do not represent all of the technical improvements provided within the scope of the claims.

Figure 2:
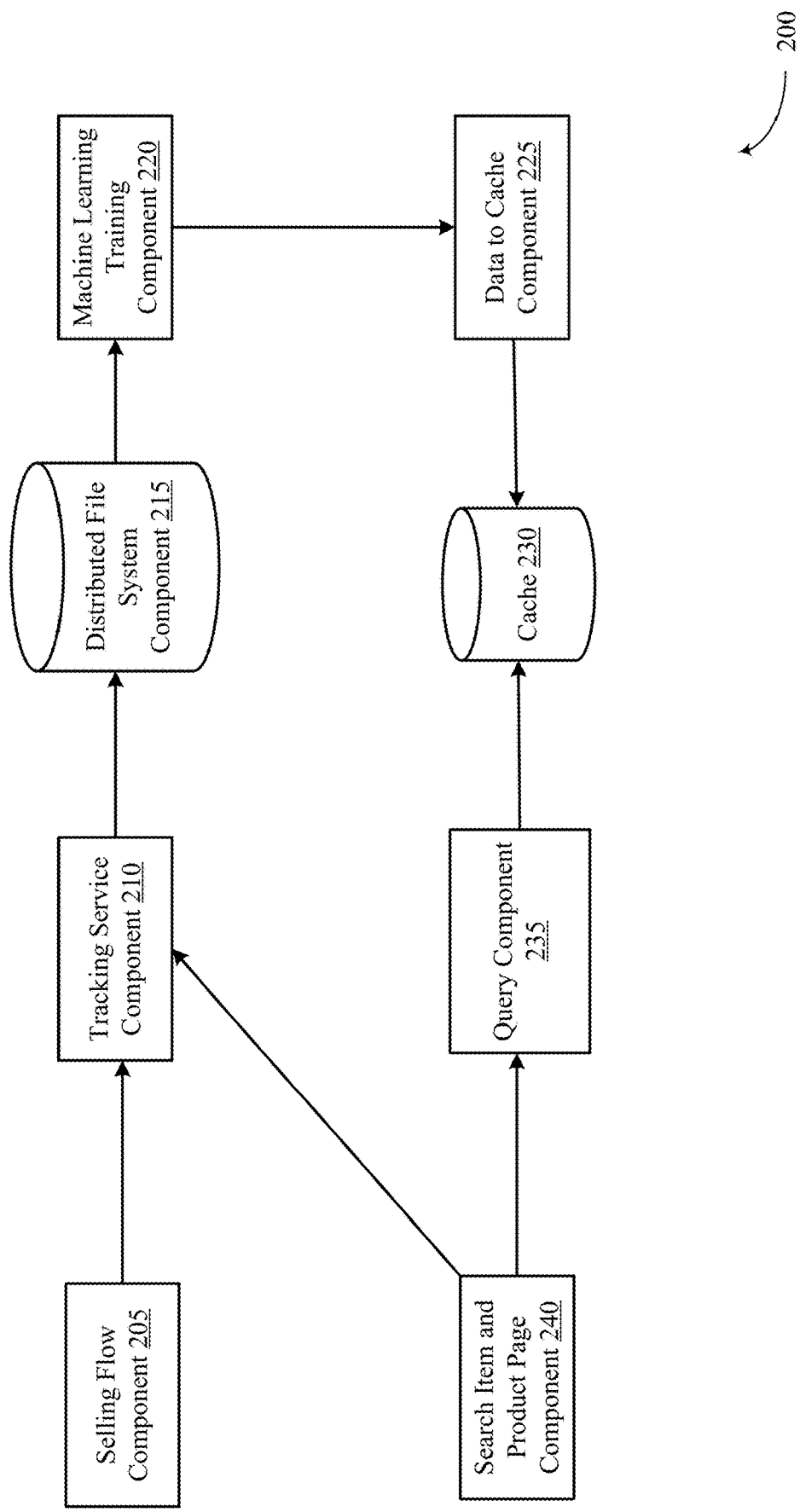
FIG. 2 illustrates an example of an application flow that supports techniques for automatic filling of an input form to generate a listing in accordance with aspects of the present disclosure.

FIG. 2 illustrates an example of an application flow 200 that supports techniques for automatic filling of an input form to generate a listing in accordance with aspects of the present disclosure. Components of the application flow 200 may include components of server system, such as server system 125 of the system 100, as described with reference to FIG. 1, for implementing an online marketplace. Some components of application flow 200 may be within or communicating with a data center, such as data center 120, or a cloud platform, such as cloud platform 115, or both. Application flow 200 may represent a number of components used to generate a listing for an item in order to efficiently utilize digital forms when listing an item on an online marketplace.

Selling flow component 205 may interact with one or more users to generate listings from one or more users, or "sellers" that may intend to sell one or more items (e.g., products) via an online marketplace. The seller may be a user operating a user device, such as a user device 110 as described with respect to FIG. 1. The interaction with selling flow component 205 may prompt the seller to input a number of parameters describing the item to be listed for sale via an online marketplace. In an example, the selling flow component 205 may cause the user device 110 to present a graphical user interface including a digital form for generation of a listing. A seller may generate a listing of an item (e.g., product) for sale that includes a description of the product, and, in some cases, may upload to the selling flow component 205 one or more images of the item.

In some cases, the seller may input a listing (one or more attributes for an item) associated with a product. In some examples, the selling flow component 205 may suggest a product to the seller for the listing based on the description of the product provided by the seller. Additionally or alternatively, the selling flow component 205 may suggest additional attributes for the product based on a subset of attributes provided by the seller. In some cases, the selling flow component 205 may cause the seller user device 110 to display a menu for selecting by the seller of a suggested product or a suggested attribute for the listing. In an example, a seller may interact with selling flow component 205 to generate a listing for a tablet computer, such as an Apple iPad. The specific Apple iPad listed by the seller may include further characteristics that are included in the listing. For example, the listing may include that the product for sale is an Apple iPad Air 64 GB. Based on the received attributes, the selling flow component 205 may predict that the Apple iPad Air 64 GB has Wi-Fi capabilities. In one example, the selling flow component 205 may generate a listing for the product based on the attributes provided by the seller as well as attributes predicted by the selling flow component 205.

The selling flow component 205 may categorize the listing as for a particular product of a set of products available to purchase via the online marketplace. A listing may be mapped to a particular product where the items listed for sale have the same or similar characteristics, but may permit some variation to exist between the items while still being mapped to the same product. In some cases, the seller generating the listing may select or recommend that the listing is for a particular product. The user-recommended product for the listing may be updated or changed by the selling flow component 205 or a machine learning training component 220.

In some examples, the selling flow component 205 may categorize a set of one or more items as being for a product by a product identification mapping process. The product identification mapping process may include an analysis of the initial product as suggested by the seller, include a confidence analysis of the accuracy of that selection based on the title, product details, analysis of mapping of similar products to a search query provided by a buyer, or the like. The product identification mapping process may also extend to other similar clusters of products using an algorithm. This product identification process may be performed by the selling flow component 205 or the machine learning training component 220. In some examples, the seller may indicate product information using a digital form displayed on the user device for the seller. Alternatively, the seller may refrain from indicating the name of the product and may instead include other identifiers associated with the product (such as UPC). In such cases, the selling flow component 205 may identify the product based on prior listings associated with the same product, and may provide the seller with the product identification information (such as a product name, title of the listing, etc.)

In some examples, the selling flow component 205 or the machine learning training component 220 may provide for automatic filling of an input form to generate a listing. In one example, the selling flow component 205 or the machine learning training component 220 may execute a machine learning algorithm (e.g., neural network algorithm) to predict one or more attributes for the item. An example of the machine learning algorithm used to automatically fill an input form may be a neural network, such as a transformer-based model. In an example, the machine learning algorithm may be trained using some or all listings uploaded for an item (e.g., when a listing is created or updated). In an example, items titles may be selected for a same product with the same features (e.g., condition, brand, color. etc.). In some examples, the machine learning model may use top K popular items (e.g., frequently clicked, frequently bought by users, etc.) as the target for training of a machine learning model, where K is an integer.

In some examples, the machine learning algorithm may be used to determine a title length distribution of one or more listings updated for an item. In some cases, the title length distribution may be used to identify a title length (e.g., in number of words) yielding the highest sale price of the item. In some examples, the title length distribution may be used to identify a title length (e.g., in number of words) yielding a quickest sale time of the item. The machine learning system may extract one or more characteristics of a prior sale of an item (e.g., price at which the item was sold, time between the listing of the item and the sale of the item, length of title of the sold item, number of offers received for the item, etc.), and determine user behavior data corresponding to the item.

Each listing uploaded by one or more sellers may be tracked by a tracking service component 210. The tracking service component 210 may forward the listing and corresponding seller uploaded titles for storage in a distributed file system component 215. Tracking service component 210 may monitor buyer behavior when viewing one or more listings (e.g., listings including seller updated titles) in a search results pages. Examples of search results pages including listings that may be monitored are also discussed with reference to FIG. 4. Tracking service component 210 may monitor a listing presented in a search results page for purchases, as well as monitor user interaction with the product listing and communicate user behavior data to the distributed file system component 215. Distributed file system component 215 may be an example of a HADOOP application. Distributed file system component 215 may use a network of multiple computers to analyze large amounts of data. Distributed file system component 215 may monitor and analyze sales throughout the online application as well as analyze sales based on user behavior data as detected by tracking service component 210.

The machine learning training component 220 may utilize a transformer based model to autofill digital forms related to a listing. The machine learning training component 220 may use a form bidirectional encoder representations transformer (BERT) architecture. Other transformer-based machine learning models may also be used to implement the techniques discussed herein. The form-BERT architecture may follow a BERT-base architecture including, for example, 12 encoder layers, and 12 attention heads per layer with, for example, 768 hidden units and uses the "same WordPiece" tokenizer. In an example, Form-BERT input may include three types of textual entities: listing title (free-text), attribute name (e.g., "Color") and attribute value (e.g., "Black") for a natural language text input from a seller. In some examples, the various input entity boundaries (i.e., title, attribute name or attribute value) may be defined using the special [SEP] token. Each of the three input types is further represented by a different (entity) type embedding. Using such embeddings, the machine learning training component 220 may allow the machine learning model to assign different importance (e.g., weights) to various input tokens based on the type of entity (i.e., title, attribute name or attribute value) they are associated with. In addition, the machine learning training component 220 may allow the machine learning model to link between the input free-text tokens to their apparent structured role (i.e., either attribute name or value).

A seller may provide free natural language text (as an input to a digital form) as a listing to the machine learning training component 220. For instance, a user can fill out form fields in an arbitrary order (e.g., filling first the third field and after that the first field). In such cases, the machine learning training component 220 may handle input attribute name-value pairs without a defined order. In particular, the machine learning training component 220 may permute the positional embeddings of the attribute name-value pairs at each batch during training to prevent the machine learning model from learning a specific attributes ordering. In addition, the attribute name-value pairs positional embeddings may start from the value 100 in order to be distinctive compared to title tokens which start from 0 (listings titles in our dataset are shorter than 100 tokens). Moreover, the machine learning training component 220 may keep the positional embeddings of a specific attribute name-value pair consecutive (e.g., "Color"=100, "Black"=101) in order to keep the pairing between attribute names and values.

The machine learning training component 220 may not pre-train or fine-tune the form-BERT. Instead, the machine learning training component 220 may use a masked language model (MLM) pretraining task to both train the model and to predict each attribute value during inference. Since form-BERT aims to predict attribute values, the machine learning training component 220 may modify the MLM task such that during training attribute values are masked. Specifically, at each batch, up to 70% of the attribute values are randomly masked (this parameter can be further tuned). During inference, the attribute values are masked and the machine learning training component 220 may train the form-BERT to predict an attribute value per masked token.

Since an attribute value may include multiple tokens or sub-tokens, all attribute values are pre-processed to be included in the tokenizer vocabulary as a single token. This pre-processing enables using a single [MASK] token per attribute in the inference phase.

Thus, the machine learning training component 220 may generate a machine learning model to predict and auto-fill digital-forms field (attribute) values based on free-text and zero or more known values. Form-BERT (e.g., machine learning model) includes distinct embedding types for the input free-text, attribute names and attribute values, a modified masked language model which randomly masks attribute values, and permuted positional embeddings to address the uncertainty of the order of words of natural language text in which a user may fill the digital-form. The machine learning training component 220 may generate form-BERT that assists sellers in auto-filling digital-forms based on their listing title and zero or more known attribute values. Techniques depicted herein allow for the flexibility to update the model predictions and auto-fill potentially additional fields when a seller voluntarily provides some of the attribute values or adopts some of the model suggestions. The machine learning model may be applicable to multiple online marketplaces which leverage digital-forms to collect listing information which includes a set of predefined attributes combined with a free-text box. For example, an online vacation rental marketplace could leverage its historical listings data to autofill various amenities based on the rental free-text description.

The machine learning training component 220 may generate the attributes metric for a listing based on a determination of what words are included in similar listings. In some examples, the machine learning training component 220 may generate the attributes metric for a listing based on a determination of how well the listing was able to achieve a desired outcome (e.g., sell an item quickly for a higher price as compared to titles for other listing for a product). In some cases, the machine learning training component 220 may generate the user interaction metric based on the user behavior data. For instance, if the user behavior data indicates that a buyer has a higher probability to purchase a product when a particular word is included in the listing, then the user interaction metric may apply a higher score to a title including the particular word. In some examples, the user interaction metric may apply a weighting to some or all of the one or more user behavior data to determine a numerical score that may indicate how well a listing is able to achieve the desired outcome.

When generating the user interaction metric, the machine learning training component 220 may normalize the user interaction metric to account for any differences between items in the listings. The user interaction metric may be a numerical value assigned to each listing for a product. The machine learning model may rank the listings available for a product based on the user interaction metrics (e.g., place in numerical order), and may determine which listings characteristics provide the highest click rate and/or sale rate for a product. In some examples, training of a machine learning model by the machine learning training component 220 may be product specific, and may refine a suggested title for a listing differently for a first product (e.g., smartphone) than how a suggested title is refined for a second product (e.g., golf clubs) that differs from the first product.

In one example, the machine learning training component 220 may add at least one additional word to the seller uploaded listing to auto-populate the digital form and generate the refined listing. For example, the machine learning training component 220 may determine that a particular word, when included in a listing generates higher user engagement (e.g., higher score). The machine learning training component 220 may add the word to the seller uploaded listing upon determining that the seller uploaded listing has that particular word missing. In some examples, the machine learning training component 220 may substitute at least one word from the seller uploaded listing to generate the updated listing. For instance, the user behavior data may suggest that a buyer has a higher probability (or likelihood) to buy a product if a particular word is included in the listing of the product. That is, the particular word may be associated with a higher probability score.

Additionally or alternatively, the machine learning training component 220 may determine a relative order of the words included in a seller uploaded natural text input, and may generate the listing by rearranging the words of the seller uploaded input according to the relative order. In some examples, the machine learning training component 220 may use a feedback loop in order to iteratively update the listing over time. For example, the tracking service component 210 may receive additional user data and may update the user interaction metric. For example, the machine learning training component 220 may add an attribute for a listing and provide an option for the user to confirm or deny the added attribute. The machine learning training component 220 may use the user confirmation or denial data to generate an updated listing as well as to further refine the machine learning model. Additionally or alternatively, the machine learning training component 220 may provide the updated listing for display in response to receiving a subsequent search query from a buyer.

Once the digital form is auto-filled to generate a listing, the machine learning training component 220 may forward the listing and an identification of its product to a data to cache component 225 using a workflow management platform (e.g., Apache Airflow). The data to cache component 225 may be an example of a cache layer, such as a memory cache (e.g., memcache) or a non-structed query language (non-SQL or NOSQL) database. The data to cache component 225 may provide the listing and an identification of its product for storage in cache 230.

When a buyer user device (e.g., user device 110) uses an online application (e.g., in an online marketplace) to transmit a search query for an item listed for sale in the online marketplace, a query component 235 may implement a service (e.g., representational state transfer (REST) service) to respond to the query. The query component 235 may query the cache 230 using the search query to identify a particular product of a set of available products and one or more listings that match the search query. In some cases, the cache 230 may return identifiers of which listings, match the search query, and an identifier of a product and a corresponding refined listing.

As the prospective buyer interacts with the search results page, the tracking service component 210 may coordinate with the search item and product page component 240 to monitor the behavior of the prospective buyer to update the one or more user behavior data (e.g., user click, whether user purchased a listed item after viewing the listing, etc.) stored in the distributed file system component 215. In some examples, the machine learning training component 220 may implement a cluster-computing framework that may mine the data in the distributed file system component 215 to determine whether the refined title has resulted in a particular desired outcome (e.g., an increase in purchase likelihood). Components of the application flow 200 may thus provide for auto-filling listing attributes upon receiving free-text, list of known attribute names, and zero or more attribute values from a user. Additionally or alternatively, the components of the application flow 200 may monitor buyer behavior over time to establish a feedback loop to train (e.g., continuously train) the machine learning model to automatically fill a form to generate a listing for a product.

Figure 3:
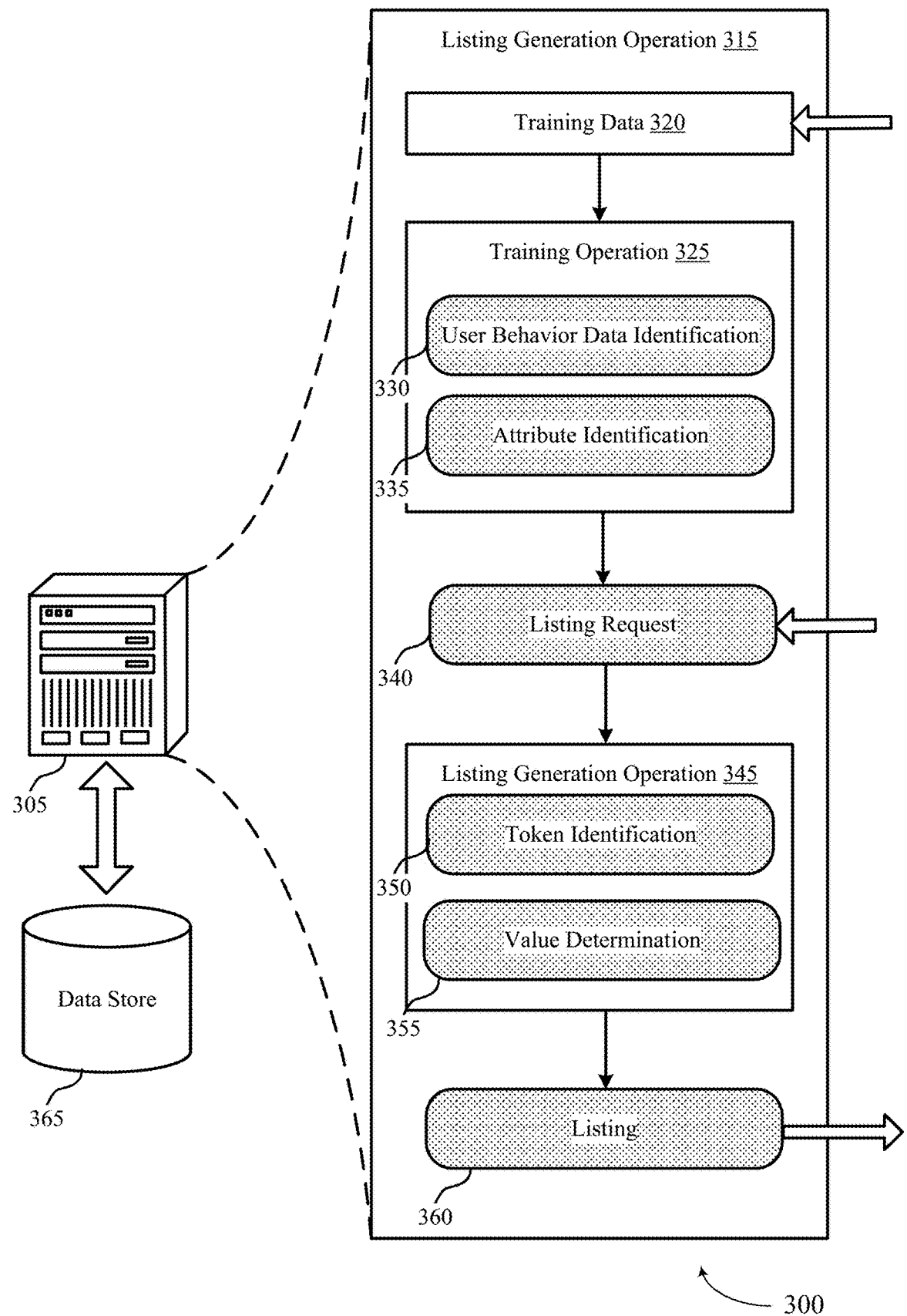
FIG. 3 illustrates an example of a system that supports techniques for automatic filling of an input form to generate a listing in accordance with aspects of the present disclosure.

FIG. 3 illustrates an example of a system 300 that supports techniques for automatic filling of an input form to generate a listing in accordance with aspects of the present disclosure. The system 300 may include a device 305 (e.g., an application server or server system) and a data store 365. In some cases, the functions performed by the device 305 (such as application server) may instead be performed by a component of the data store 365. A user device (not shown) may support an application for online marketplace. Specifically, a user device in combination with the device 305 may support an online marketplace that generates refined titles by using machine learning models. An application (or an application hosting the online marketplace) may train a mathematical model (e.g., artificial intelligence model) at the device 305, where the device 305 may identify results 360 based on training data and using the trained data to generate a refined title for a listing. In some examples, the device 305 may provide the results 360 to a user device (not shown).

According to one or more aspects of the present disclosure, a user device may be used by a seller to generate a listing and by a buyer to provide a search query and receive one or more search results. Specifically, the user device may display an interactive interface for displaying an online marketplace and displaying one or more search results. In some examples, the user device may be a mobile device including a software application for generating a listing (via a listing generation form). In some cases, the interface at the user device may run as a webpage within a web browser (e.g., as a software as a service (SaaS) product). In other cases, the interface may be part of an application downloaded onto the user device. A user (seller and/or buyer) operating the user device may input information into the user interface to log on to the online marketplace. In some cases, a user may be associated with a user credential or user ID, and the user may log on to the online marketplace using the user credential.

In some cases, the device 305 in combination with the data store 365 may train or develop a mathematical model (e.g., artificial intelligence model, a machine learning model, a neural network model, a transformer-based model, etc.) to auto-complete a form and generate a listing. In some aspects, the device 305 (or application server) may receive a request to develop an artificial intelligence model to auto populate one or more fields of a listing with one or more predicted attributes values. Additionally or alternatively, the device 305 may determine a need to develop an artificial intelligence model (e.g., machine learning model) for classifying seller uploaded descriptions and generate a listing. As described herein, the device 305 in conjunction with the data store 365 may perform a listing generation operation 315.

According to one or more aspects of the present disclosure, the listing generation operation 315 may be performed by the device 305, such as a server (e.g., an application server, a database server, a server cluster, a virtual machine, a container, etc.). Although not shown in FIG. 3, the listing generation operation 315 may be performed by a user device, a data store, or some combination of these or similar devices. In some cases, the device 305 may be a component of a subsystem 125 as described with reference to FIG. 1.

The device 305 may support computer aided data science, which may be performed by an artificial intelligence-enhanced data analytics framework. The device 305 may be an example of a general analysis machine and, as such, may perform data analytics and autofill the form and provide a listing based on receiving a product description from a user (e.g., seller).

According to one or more aspects of the present disclosure, the device 305 may receive training data 320 from one or more prior listing activities and/or purchase activities. As described herein, the training data 320 may be or may include the user behavior data. For instance, the training data 320 may include user activity based on an interaction activity associated with search results delivered to one or more user devices. For example, a user device (such as a user device separate from device 305) may receive a search results page (including multiple listings associated with a product) in response to a search query. The user device (not shown) may receive the search results page on an interactive interface. This interface may run as a webpage within a web browser, or the interface may be part of an application downloaded onto the user device. The device 305 may then receive interaction activity information associated with the search results page. Additionally or alternatively, the device 305 may monitor attributes included in listings.

After receiving the training data 320, the device 305 may perform a training operation 325. The training operation 325 may broadly include a user behavior data identification 330 and an attribute identification 335. As part of the user behavior data identification 330, the device 305 may identify a correlation between a search term and terms included in a listing, a length of time that a buyer spends viewing a particular listing before purchasing, or failing to purchase, the item. The device 305 may identify the first set of attributes associated with a first listing and a second set of attributes associated with a second listing. Both the first listing and the second listing may be associated with the same product. In some examples, as part on the attribute identification 335, the device 305 may perform a masking operation described with reference to FIG. 4. For example, the device 305 may perform the training operation 325 by inputting, to a transformer-based machine learning model, an indication of an attribute field token for a listing for an item and masking one or more of attribute field values of the item corresponding to the attribute field token. That is, the device 305 may train the transformer-based machine learning model to predict one or more attributes for a listing for an item by training the transformer-based machine learning model with a subset of attribute values for a particular listing for the item. The device 305 may mask some attribute values (e.g., hide the attribute values from the model) such that the transformer-based machine learning model may predict values for the masked attributes of the item as part of the training process. For example, an item being listed for sale via an online marketplace may be a Pokémon card. The Pokémon card may have a set of attributes, such as listed in Table 1 below. The transformer-based machine learning model may be trained by masking certain combinations of one or more of the set of attributes (e.g., omitting values for certain attributes) and providing one or more other attributes in natural language text, to train the transformer-based machine learning model to predict correct values of the masked attributes. For example, a value of a creature type attribute may be omitted from natural language text input to the transformer-based machine learning model during training, and values for a card name attribute, a character name attribute, etc., may be provided to the transformer-based machine learning model to train the transformer-based machine learning model to predict the omitted value for the creature type attribute. The device 305 may thus train the transformer-based machine learning model to predict an attribute field value based on the attribute field token and natural language training text sample. In some examples, the device 305 may implement a form-BERT described with reference to FIGS. 1 and 2 to perform the training operation 325 and a listing generation operation 345.

As described herein, the device 305 may receive a listing request 340. The listing request 340 may include a request to generate the listing for the item, the request including a natural language text input as a title for the listing. In some examples, including a suggested title for a first listing for a product. For example, a seller may use a user device (such as a user device separate from device 305) to fill out a digital form for generating a listing for a product. The seller may provide one or more attributes for the listing on an interactive interface of the user device. This interface may run as a webpage within a web browser, or the interface may be part of an application downloaded onto the user device. Based on receiving the one or more attributes, the device 305 may generate a predicted value for an item description attribute of the item. As depicted herein, a value of the item description attribute may be unspecified in the natural language text and may describe a feature associated with the item as produced. In some examples, the device 305 may generate the predicted value based on inputting the natural language text to a transformer-based machine learning model.

Upon receiving the listing request 340, the device 305 may perform a listing generation operation 345 based on the attributes included in the listing request 340. In some examples, the listing generation operation 345 may include a token identification process 350 and a value determination process 355. In one example, the device 305 may identify a set of words from the suggested title and autofill a digital form to generate one or more predicted attributes for a listing based on identifying a set of words included in the inputted listing. As part of the token identification 350, the device 305 may parse the natural language text (received as part on the listing request 340) to generate a title token. The device 305 may then identify an attribute token of the transformer-based machine learning model associated with the item in which an attribute value is unspecified in the natural language text based on the title token. Upon identifying the attribute token, the device 305 may perform value determination 355. As part of the value determination 355, the device 305 may apply the transformer-based machine learning model to generate the predicted value for the item description attribute based on a set of title tokens and the attribute token.

The device 305 may apply the listing generation operation 345 such that, for example, a machine learning model assigns a score to each predicted value for an attribute. Additionally or alternatively, the listing generation operation 345 may assign a score to a sequence of one or more sets of words as a value for an attribute. For example, the listing generation operation 345 may assign a score to each word included in a value for an attribute based on the likelihood that the word is included in a value for that attribute. In one example, a seller may provide the listing title "Pokemon Pikachu VMAX 188/185 Vivid Voltage Gold Metal", and the device 305 may predict attribute values which are not explicitly mentioned in the title (e.g., "Manufacturer: Nintendo" and "Language: English").

According to one or more aspects of the present disclosure, the device 305 may cause presentation, via the user interface associated with the online marketplace, of the listing 360 including the predicted value for the item description attribute. Referring to the prior example, upon receiving a natural language text "Pokemon Pikachu VMAX 188/185 Vivid Voltage Gold Metal," the device 305 may display "Manufacturer: Nintendo" and "Language: English" in the digital form. In some examples, the device 305 may track whether a seller confirms or denies the predicted value. That is, the device 305 may receive an indication confirming or disagreeing with the predicted value for the item description attribute. Based on the indication, the device may update a probability value associated with the item description attribute. For example, the seller may agree that "Nintendo" is the correct predicted value for the attribute "Manufacturer." Based on the received confirmation, the device 305 may generate, based on the transformer-based machine learning model, a second predicted value for a second attribute of the item. For example, after a user confirms that a value for one attribute is correct, the transformer-based machine learning model may have more or less confidence that a predicted value for a second attribute is correct. Similarly, after a user confirms that a value for one attribute is incorrect, the transformer-based machine learning model may have more or less confidence that a predicted value for a second attribute is correct. The transformer-based machine learning model may thus assign probabilities to a set of candidate values for an item description attribute, and select one of the candidate values for the attribute as a predicted value for the item description attribute. Receiving an indication from a user of a predicted value being correct or incorrect for one attribute may be used by the transformer-based machine learning model to update one or more predictions for one or more additional attributes.

Figure 4:
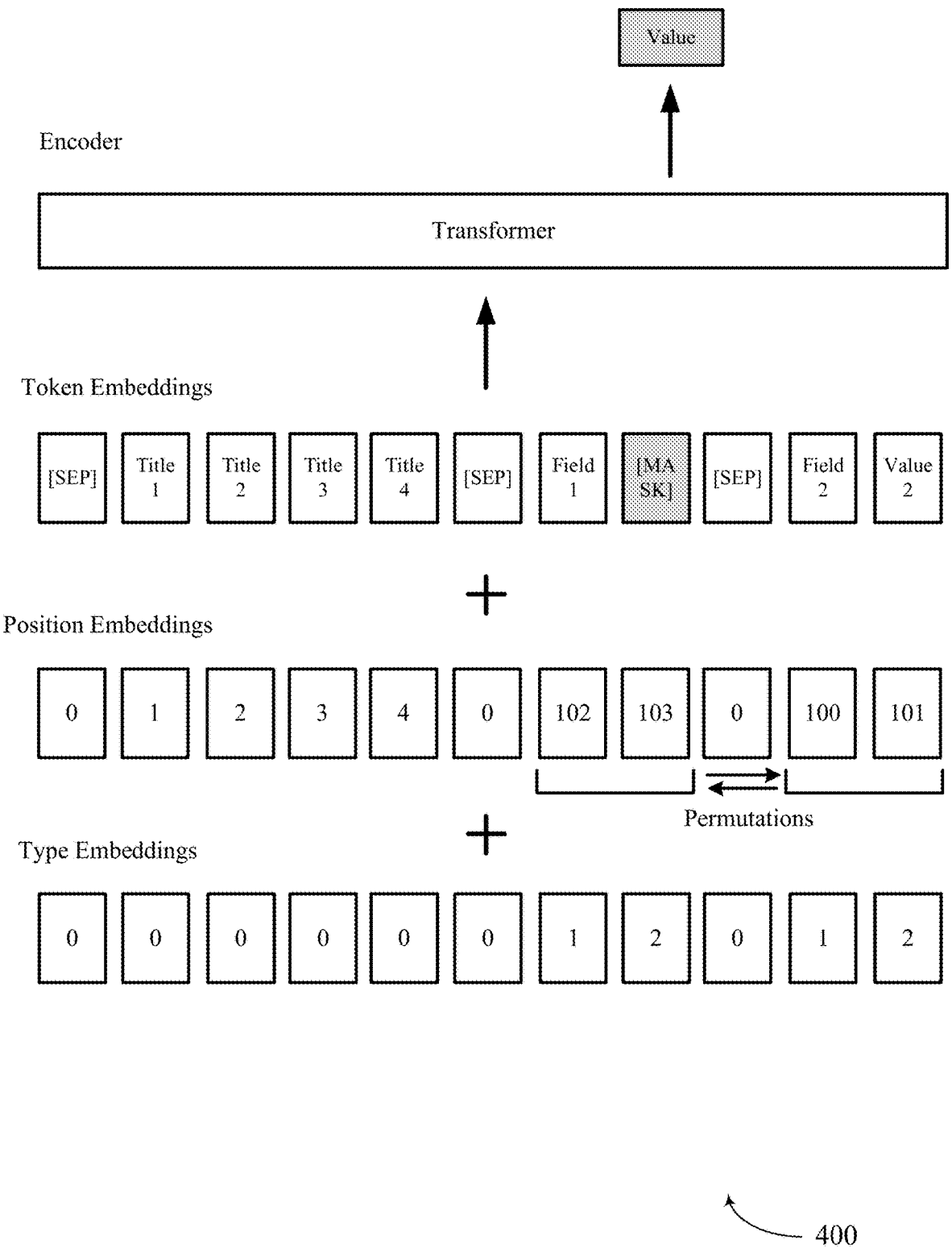
FIG. 4 illustrates an example of a transformer-based machine learning model that supports techniques for automatic filling of an input form to generate a listing in accordance with aspects of the present disclosure.

FIG. 4 illustrates an example of a transformer-based machine learning model 400 that supports techniques for automatic filling of an input form to generate a listing in accordance with aspects of the present disclosure. The transformer-based machine learning model 400 may be used to generate a predicted value for an attribute in a listing. For example, a user (e.g., seller) may fill out a form including a listing title and one or more attributes, The transformer-based machine learning model 400 may predict a value of an attribute that is absent from the attributes provided by the user.

The transformer architecture in the transformer-based machine learning model 400 may be suitable for the type of input including both ordered input (i.e., listing title) and unordered input (set of attribute name-value pairs). Moreover, the transformer-based machine learning model 400 may be able to handle cases where some of the attribute values are known, while the rest may be predicted.

The task of attribute name-value pairs extraction from listing titles may be implemented by casting an extraction task as a named-entity recognition (NER) task. In some cases, the task of attribute name-value pairs extraction from listing titles may be performed by applying hand-crafted regular expressions, rules or dictionaries or by using various NLP and machine learning techniques such as semantic parsing, sequential-classification and entity matching [1, 4, 6-8, 11-14, 16]. As depicted in the example of FIG. 4, the transformer-based machine learning model 400 may extract both explicit and implicit attributes using an MLM approach.

To make the MLM task more sample-efficient, in some cases, the transformer-based machine learning model 400 may replace some tokens with plausible alternatives sampled from a small generator network. In some examples, the system may use combinations of two masking types: Phrase-Level masking, where a phrase is defined as a group of words or characters acting together as a conceptual unit and Entity-Level Masking (e.g., persons, organizations). The transformer-based machine learning model 400 may perform a masking operation where each attribute value may include several tokens that are masked as a single unit.

Using such an approach, sellers can be recommended with multiple attribute values without the transformer-based machine learning model 400 know in advance all possible listing attributes. In addition, the transformer-based machine learning model 400 can scale to multiple domains and attribute types without any manual labeling. The transformer-based machine learning model 400 may be trained using token embeddings, position embeddings and type embeddings. Upon receiving a request to generate a listing for an item, a system supporting the transformer-based machine learning model 400 may parse the natural language text input by a user for a listing to generate a title token. The system may then identify an attribute token of the transformer-based machine learning model associated with the item in which an attribute value is unspecified in the natural language text based on the title token.

In contrast to other neural network algorithms such as Recurrent Neural Networks or Convolutional Neural Networks, the input order is not an inherent part of the transformer-based machine learning model's 400 network architecture. In some examples, the order of input may be included as an additional positional embedding per input token. Hence, by using different positional embeddings per ordered and unordered inputs, the transformer-based machine learning model 400 architecture provides for flexibility to address a mixture of inputs in a single architecture. The listing attributes may not adhere to any particular order, since users may add such attributes in any order. To improve the transformer-based machine learning model's 400 generalization to such arbitrary inputs, the transformer-based machine learning model 400 may be trained using an enhanced training scheme, where attribute name-value pairs are permuted at each batch.

As described with reference to FIG. 4, the transformer-based machine learning model 400 may support three special "type" embeddings, one per each entity type (i.e., title, attribute name or attribute value), with which each token input may be associated. Using such type embeddings helps the transformer-based machine learning model 400 to identify the role of various input tokens. That is, the transformer-based machine learning model 400 may learn which tokens are expected to represent attribute values and further weigh them differently.

During training phase, the transformer-based machine learning model 400 may be training using attribute tokens, position tokens and type tokens. The transformer-based machine learning model 400 may further be trained using a subset of the available attributes for a product. That is, the transformer-based machine learning model 400 may be trained to predict a value of an attribute based on a subset of other attributes. As one example, the transformer-based machine learning model 400 may be trained using a dataset including listings from a category named "Collectible Card Games". The dataset may include approximately 960,000 listings which were listed during six months. Each training example may include a listing title and at least one attribute name-value pair provided by the seller (on average, each listing in our dataset has 4.5 attribute name-value pairs). To remove outliers and reduce the complexity of the task, the data may be truncated to include the top-20 most used attributes and values which appear at least 5 times; resulting in about 11,000 of the most frequent values in the dataset. Following filtering, the attribute name-value pairs covered about 97% of all the attribute name-value pairs occurrences in our dataset. 4% of the dataset may be used for validation and model selection, and an additional 4% for testing, while the remaining may be used for training. The top-10 attributes and number of unique values are reported in Table 1:

TABLE 1

| Attribute | Unique Values | Examples |
| --- | --- | --- |
| Card Name | 5167 | Charizard, Pikachu |
| Character | 3175 | Chamander, Mewtwo |
| Set | 2380 | Base Set, Promo |
| Features | 1542 | Holo, 1st Edition |
| Creature Type | 1080 | 1080 Effect, Hero |
| Card Type | 895 | Pokemon, Creature |
| Specialty | 743 | GX, EX |
| Manufacturer | 558 | Nintendo, Konami |
| Rarity | 554 | Rare, Common |
| Grade | 378 | 10, 9.5 |

The transformer-based machine learning model 400 may be trained based on lowercasing the listing titles and attribute name-value pairs. The system may further concatenate attribute names or values with multi-tokens with double under-score to a single token (e.g., "United States" is converted to "united states"). The transformer-based machine learning model 400 may be trained for a maximum of 8 epochs with a batch size of 8, a maximum sequence length of 350, using an optimizer and a learning rate of 5e-5. Precision, recall and F1 may be used as precision metrics for the transformer-based machine learning model 400. Both metrics may be calculated by summing up all the correct/wrong attribute values across all listings and not by averaging per listing.

To evaluate the contribution of the enhancements which the transformer-based machine learning model 400 (e.g., form-BERT) entails compared to BERT, an ablation experiment of the transformer-based machine learning model 400 may be performed where type embeddings were set to 0 for all tokens and its positional embeddings were set as absolute positions. A qualitative evaluation of the transformer-based machine learning model 400 as depicted in Table 2 ensures that transformer-based machine learning model 400 predictions are not limited to attribute name-values which were explicitly mentioned in the listing title.

TABLE 2

| Attribute | Value |
| --- | --- |
| Card Type | Pokemon |
| Character | Pikachu |
| Specialty | VMAX |
| Set | Vivid Voltage |
| Language | English |
| Year Manufactured | 2020 |
| Game | Pokémon TCG |
| Manufacturer | Nintendo |
| Finish | Holo |
| Features | Full Art |

Table 2 shows an example of predictions made by the transformer-based machine learning model 400 for the listing title "Pokemon Pikachu VMAX 188/185 Vivid Voltage Gold Metal," where none of the attribute values are given as natural language input. As depicted herein, the transformer-based machine learning model 400 may be able to accurately predict attribute values which are not explicitly mentioned in the title (e.g., "Manufacturer: Nintendo" and "Language: English"). Thus, the transformer-based machine learning model 400 may be used to predict and auto-fill digital-forms field (attribute) values based on free-text and zero or more known values. The transformer-based machine learning model 400 may include distinct embedding types for the input free-text, attribute names and attribute values. The transformer-based machine learning model 400 may further include a modified masked language model which randomly masks attribute values. Additionally, the transformer-based machine learning model 400 may include permuted positional embeddings to address the uncertainty of the order in which a user may fill the digital-form.

The transformer-based machine learning model 400 may assist sellers in auto-filling digital-forms based on their listing title and zero or more known attribute values. In some examples, the transformer-based machine learning model 400 may allow for flexibility to update the model predictions and auto-fill potentially additional fields when a seller voluntarily provides some of the attribute values or adopts some of the model suggestions.

Figure 5:
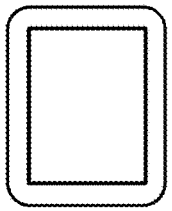
FIG. 5 illustrates an example of a user interface that supports techniques for automatic filling of an input form to generate a listing in accordance with aspects of the present disclosure.

FIG. 5 illustrates an example of a user interface 500 that supports techniques for automatic filling of an input form to generate a listing in accordance with aspects of the present disclosure. The user interface 500 may be an example of a page displaying a digital form (listing form 505) for listing generation. The user interface 500 may be displayed to a prospective seller at a user device (e.g., user device 110) at a tablet, smartphone, or another client-facing user device.

A seller may access an online application (e.g., a website or a smart-phone app) of an online marketplace (e.g., presented by search item and product page component 240) and input a listing title 515. In an example, the seller may enter "Pokemon Pikachu VMAX 188/185 Vivid Voltage Gold Metal" as natural language text that is input as a listing title for the item. The seller may partially fill the listing form 505. For example, the seller may provide a listing title (Pokemon Pikachu VMAX 188/185 Vivid Voltage Gold Metal) and refrain from providing values for one or more other attributes. One example of attributes is described Table 2 with reference to FIG. 4. Additionally or alternatively, the seller may upload an image 510 of the listing. The filling of the listing form 505 may result in the display at the seller user device of one or more suggested attribute values for the listing. The transformer-based machine learning model may predict one or more additional attributes associated with the product. In some cases, the one or more additional attributes may be associated with the item as produced (e.g., manufacturer name, manufacturer date, etc.).

The transformer-based machine learning model may predict values for one or more additional attributes (not provided in the natural language text from the user). For instance, the transformer-based machine learning model may predict the one or more attributes as shown in Table 2 using a method described with reference to FIG. 4. The one or more suggested attribute values may include predicted values for attributes missing from the seller provided listing. In determining the value for each attribute, the transformer-based machine learning model may use a probability value. For example, for the each attribute, the transformer-based machine learning model may generate or determine a set of possible values. Based on the training data as well as prior listing information, the transformer-based machine learning model may assign a probability or a weightage to each predicted value for the attribute. The transformer-based machine learning model may then present the predicted value having the highest weightage as a value for an attribute missing from the seller's input.

As depicted in the FIG. 5, the user interface 500 may include one or more predicted values for a set of item description attributes. In the example depicted herein, the user interface 500 may present the value for attribute "Language" to be "English," the value for attribute "Year Manufactured" to be "2020," and the value for attribute "Manufacturer" to be "Nintendo." As described herein, the transformer-based machine learning model may determine multiple options for the attribute "Language." The value "English" may have the highest probability (or weightage) of being a predicted value for the attribute "Language" or may otherwise satisfy a probability threshold (e.g., meet or exceed a threshold value). Accordingly, the transformer-based machine learning model may display "English" as the value for the attribute "Language." The user interface 500 may further provide an option for the seller to confirm or deny each value for the attributes. That is, the transformer-based machine learning model may automatically fill out sections of the listing form 505 and may request the seller to either approve or decline the values that have been automatically filled out. For example, the seller may approve that the value of the attribute "Language" is "English" and the value of the attribute "Manufacturer" is "Nintendo." The seller may decline or indicate that the value for the attribute "Year Manufactured" is not "2020." Accordingly, the transformer-based machine learning model increase a weightage for the value "English" of the attribute "Language" and the value "Nintendo" for the attribute "Manufacturer." Additionally, the transformer-based machine learning model decrease a weightage for the value "2020" of the attribute "Year Manufactured." In some examples, the transformer-based machine learning model may provide a second predicted value for the attribute "Year Manufactured" after the seller declines the first predicted value. That is, the transformer-based machine learning model may replace the value for the attribute "Year Manufactured" from "2020" to another year. The user interface 500 may assist the user of a user device (e.g., user device 110) to prepare a listing for the item that includes one or more predicted values for one or more item description attributes. The user may approve the listing via user interface 500 and the online marketplace may make the listing searchable and available to other users of the online marketplace.

Figure 6:
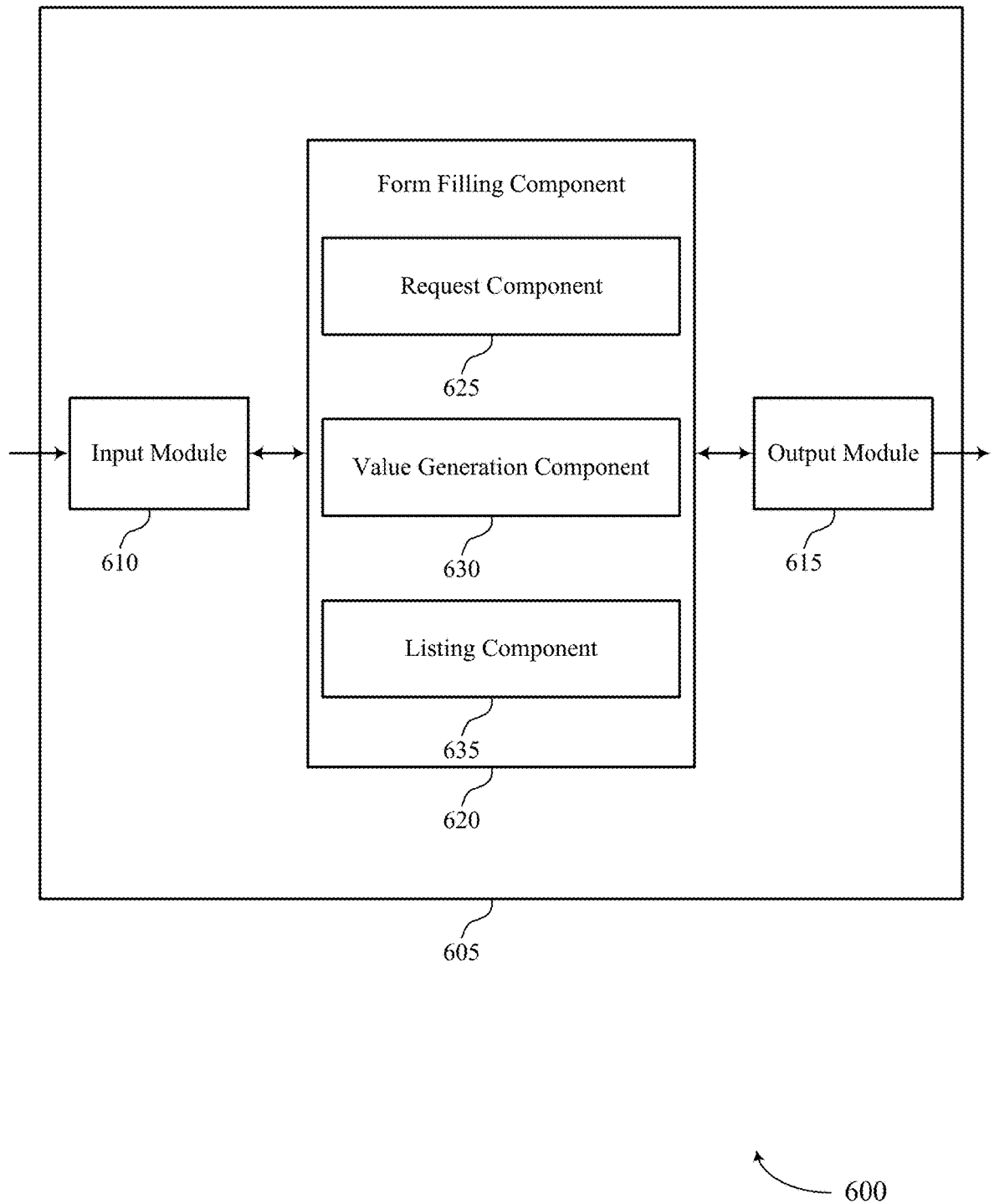
FIG. 6 shows a block diagram of an apparatus that supports techniques for automatic filling of an input form to generate a listing in accordance with aspects of the present disclosure.

FIG. 6 shows a block diagram 600 of a device 605 that supports techniques for automatic filling of an input form to generate a listing in accordance with aspects of the present disclosure. The device 605 may include an input module 610, an output module 615, and a form filling component 620. The form filling component 620 may be an example of the listing generation component 145 described with reference to FIG. 1. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the form filling component 620 to support techniques for automatic filling of an input form to generate a listing. In some cases, the input module 610 may be a component of an I/O controller 810 as described with reference to FIG. 8.

The output module 615 may manage output signals for the device 605. For example, the output module 615 may receive signals from other components of the device 605, such as the form filling component 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the form filling component 620 may include a request component 625, a value generation component 630, a listing component 635, or any combination thereof. In some examples, the form filling component 620, or various components thereof, may be configured to perform various operations (e.g., receiving, monitoring, transmitting) using or otherwise in cooperation with the input module 610, the output module 615, or both. For example, the form filling component 620 may receive information from the input module 610, send information to the output module 615, or be integrated in combination with the input module 610, the output module 615, or both to receive information, transmit information, or perform various other operations as described herein.

The form filling component 620 may support generating a listing for an item in accordance with examples as disclosed herein. The request component 625 may be configured as or otherwise support a means for receiving, via a user interface associated with an online marketplace, a request to generate the listing for the item, the request including a natural language text input as a title for the listing. The value generation component 630 may be configured as or otherwise support a means for generating, based on inputting the natural language text to a transformer-based machine learning model, a predicted value for an item description attribute of the item, where a value of the item description attribute is unspecified in the natural language text and describes a feature associated with the item as produced. The listing component 635 may be configured as or otherwise support a means for causing presentation, via the user interface associated with the online marketplace, of the listing including the predicted value for the item description attribute.

Figure 7:
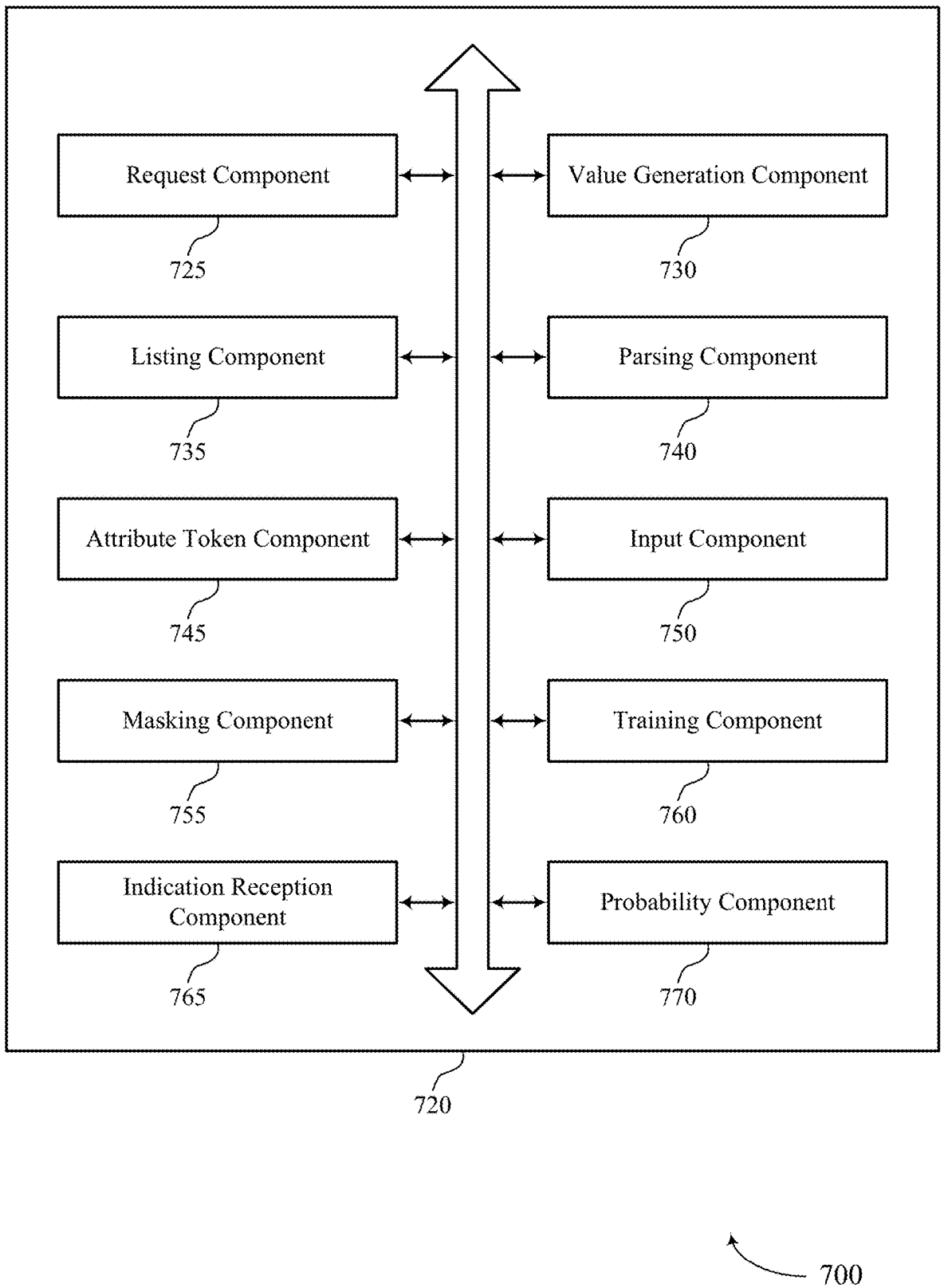
FIG. 7 shows a block diagram of a form filling component that supports techniques for automatic filling of an input form to generate a listing in accordance with aspects of the present disclosure.

FIG. 7 shows a block diagram 700 of a form filling component 720 that supports techniques for automatic filling of an input form to generate a listing in accordance with aspects of the present disclosure. The form filling component 720 may be an example of aspects of a form filling component 620, or both, as described herein. The form filling component 720, or various components thereof, may be an example of means for performing various aspects of techniques for automatic filling of an input form to generate a listing as described herein. For example, the form filling component 720 may include a request component 725, a value generation component 730, a listing component 735, a parsing component 740, an attribute token component 745, an input component 750, a masking component 755, a training component 760, an indication reception component 765, a probability component 770, or any combination thereof. Each of these components may communicate, directly or indirectly, with one another (e.g., via one or more buses).

The form filling component 720 may support generating a listing for an item in accordance with examples as disclosed herein. The request component 725 may be configured as or otherwise support a means for receiving, via a user interface associated with an online marketplace, a request to generate the listing for the item, the request including a natural language text input as a title for the listing. The value generation component 730 may be configured as or otherwise support a means for generating, based on inputting the natural language text to a transformer-based machine learning model, a predicted value for an item description attribute of the item, where a value of the item description attribute is unspecified in the natural language text and describes a feature associated with the item as produced. The listing component 735 may be configured as or otherwise support a means for causing presentation, via the user interface associated with the online marketplace, of the listing including the predicted value for the item description attribute.

In some examples, to support generating the predicted value, the parsing component 740 may be configured as or otherwise support a means for parsing the natural language text to generate a title token. In some examples, to support generating the predicted value, the attribute token component 745 may be configured as or otherwise support a means for identifying an attribute token of the transformer-based machine learning model associated with the item in which an attribute value is unspecified in the natural language text based on the title token. In some examples, to support generating the predicted value, the value generation component 730 may be configured as or otherwise support a means for applying the transformer-based machine learning model to generate the predicted value for the item description attribute based on a set of title tokens and the attribute token.

In some examples, the listing component 735 may be configured as or otherwise support a means for causing presentation, via the user interface, of the predicted value for the item description attribute in a listing creation form based on determining that the predicted value for the item description attribute satisfies a probability threshold.

In some examples, the indication reception component 765 may be configured as or otherwise support a means for receiving, via the user interface, an indication confirming or disagreeing with the predicted value for the item description attribute. In some examples, the probability component 770 may be configured as or otherwise support a means for updating a probability value associated with the item description attribute based on the indication.

In some examples, the value generation component 730 may be configured as or otherwise support a means for generating, based on the transformer-based machine learning model, a second predicted value for a second attribute of the item based on the indication.

In some examples, the input component 750 may be configured as or otherwise support a means for inputting, to the transformer-based machine learning model, an indication of an attribute field token for the listing. In some examples, the masking component 755 may be configured as or otherwise support a means for masking one or more of attribute field values corresponding to the attribute field token. In some examples, the training component 760 may be configured as or otherwise support a means for training the transformer-based machine learning model to predict an attribute field value based on the attribute field token and natural language training text sample. In some examples, the request to generate the listing for the item is received as an input to a digital form displayed on the user interface.

Figure 8:
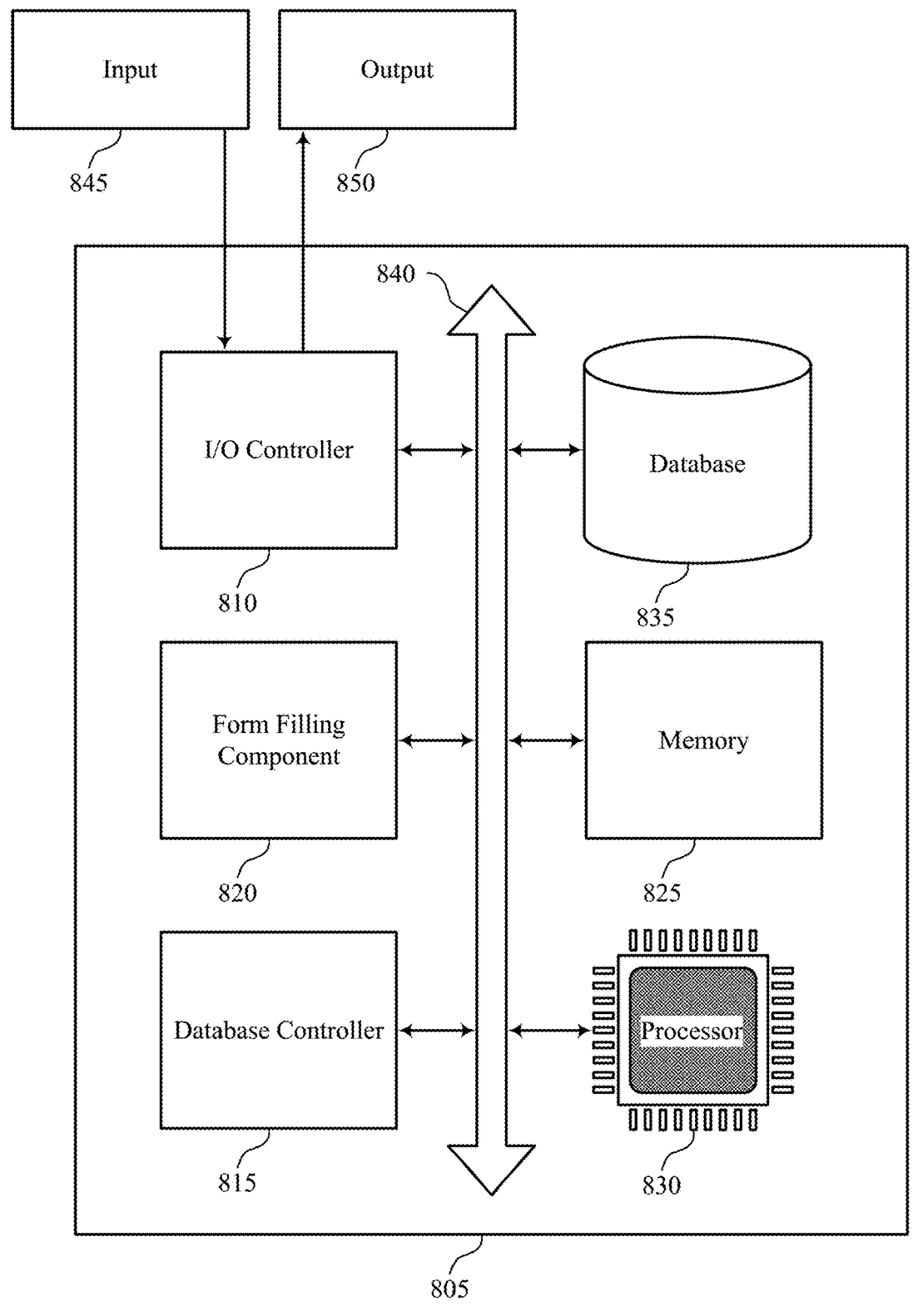
FIG. 8 shows a diagram of a system including a device that supports techniques for automatic filling of an input form to generate a listing in accordance with aspects of the present disclosure.

FIG. 8 shows a diagram of a system 800 including a device 805 that supports techniques for automatic filling of an input form to generate a listing in accordance with aspects of the present disclosure. The device 805 may be an example of or include the components of a device 605 as described herein. The device 805 may include components for bi-directional data communications including components for transmitting and receiving communications, such as a form filling component 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a BIOS which may control basic hardware or software operation such as the interaction with peripheral components or devices.

The processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting techniques for automatic filling of an input form to generate a listing).

The form filling component 820 may support generating a listing for an item in accordance with examples as disclosed herein. For example, the form filling component 820 may be configured as or otherwise support a means for receiving, via a user interface associated with an online marketplace, a request to generate the listing for the item, the request including a natural language text input as a title for the listing. The form filling component 820 may be configured as or otherwise support a means for generating, based on inputting the natural language text to a transformer-based machine learning model, a predicted value for an item description attribute of the item, where a value of the item description attribute is unspecified in the natural language text and describes a feature associated with the item as produced. The form filling component 820 may be configured as or otherwise support a means for causing presentation, via the user interface associated with the online marketplace, of the listing including the predicted value for the item description attribute.

Figure 9:
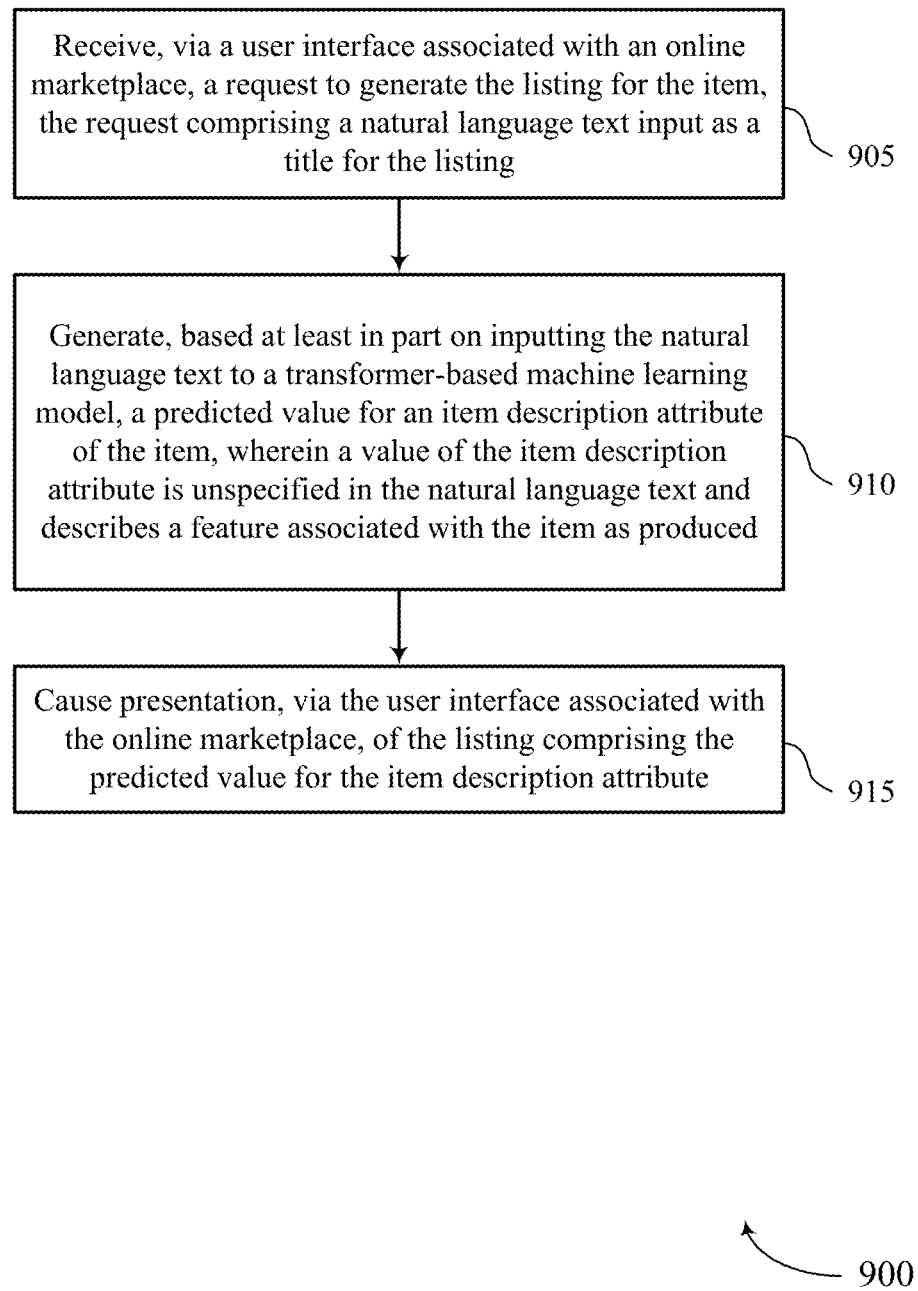
FIGS. 9 through 11 show flowcharts illustrating methods that support techniques for automatic filling of an input form to generate a listing in accordance with aspects of the present disclosure.

FIG. 9 shows a flowchart illustrating a method 900 that supports techniques for automatic filling of an input form to generate a listing in accordance with aspects of the present disclosure. The operations of the method 900 may be implemented by a listing generation component or its components as described herein. For example, the operations of the method 900 may be performed by a listing generation component as described with reference to FIGS. 1 through 8. In some examples, a listing generation component may execute a set of instructions to control the functional elements of the listing generation component to perform the described functions. Additionally, or alternatively, the listing generation component may perform aspects of the described functions using special-purpose hardware.

At 905, the method may include receiving, via a user interface associated with an online marketplace, a request to generate the listing for the item, the request including a natural language text input as a title for the listing. The operations of 905 may be performed in accordance with examples as disclosed herein. In some examples, aspects of the operations of 905 may be performed by a request component 725 as described with reference to FIG. 7.

At 910, the method may include generating, based on inputting the natural language text to a transformer-based machine learning model, a predicted value for an item description attribute of the item, where a value of the item description attribute is unspecified in the natural language text and describes a feature associated with the item as produced. The operations of 910 may be performed in accordance with examples as disclosed herein. In some examples, aspects of the operations of 910 may be performed by a value generation component 730 as described with reference to FIG. 7.

At 915, the method may include causing presentation, via the user interface associated with the online marketplace, of the listing including the predicted value for the item description attribute. The operations of 915 may be performed in accordance with examples as disclosed herein. In some examples, aspects of the operations of 915 may be performed by a listing component 735 as described with reference to FIG. 7.

Figure 10:
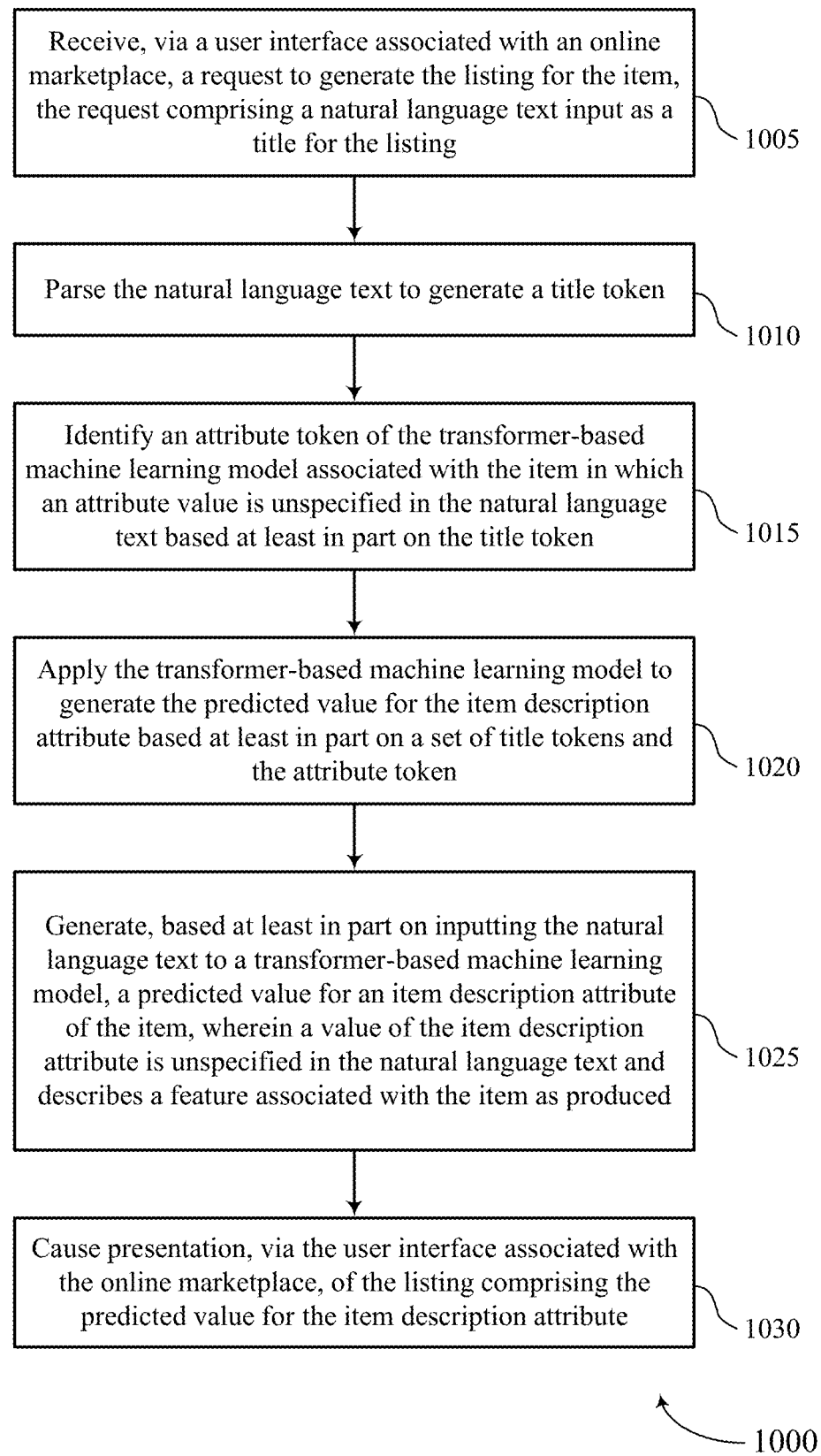

FIG. 10 shows a flowchart illustrating a method 1000 that supports techniques for automatic filling of an input form to generate a listing in accordance with aspects of the present disclosure. The operations of the method 1000 may be implemented by a listing generation component or its components as described herein. For example, the operations of the method 1000 may be performed by a listing generation component as described with reference to FIGS. 1 through 8. In some examples, a listing generation component may execute a set of instructions to control the functional elements of the listing generation component to perform the described functions. Additionally, or alternatively, the listing generation component may perform aspects of the described functions using special-purpose hardware.

At 1005, the method may include receiving, via a user interface associated with an online marketplace, a request to generate the listing for the item, the request including a natural language text input as a title for the listing. The operations of 1005 may be performed in accordance with examples as disclosed herein. In some examples, aspects of the operations of 1005 may be performed by a request component 725 as described with reference to FIG. 7.

At 1010, the method may include parsing the natural language text to generate a title token. The operations of 1010 may be performed in accordance with examples as disclosed herein. In some examples, aspects of the operations of 1010 may be performed by a parsing component 740 as described with reference to FIG. 7.

At 1015, the method may include identifying an attribute token of the transformer-based machine learning model associated with the item in which an attribute value is unspecified in the natural language text based on the title token. The operations of 1015 may be performed in accordance with examples as disclosed herein. In some examples, aspects of the operations of 1015 may be performed by an attribute token component 745 as described with reference to FIG. 7.

At 1020, the method may include applying the transformer-based machine learning model to generate the predicted value for the item description attribute based on a set of title tokens and the attribute token. The operations of 1020 may be performed in accordance with examples as disclosed herein. In some examples, aspects of the operations of 1020 may be performed by a value generation component 730 as described with reference to FIG. 7.

At 1025, the method may include generating, based on inputting the natural language text to a transformer-based machine learning model, a predicted value for an item description attribute of the item, where a value of the item description attribute is unspecified in the natural language text and describes a feature associated with the item as produced. The operations of 1025 may be performed in accordance with examples as disclosed herein. In some examples, aspects of the operations of 1025 may be performed by a value generation component 730 as described with reference to FIG. 7.

At 1030, the method may include causing presentation, via the user interface associated with the online marketplace, of the listing including the predicted value for the item description attribute. The operations of 1030 may be performed in accordance with examples as disclosed herein. In some examples, aspects of the operations of 1030 may be performed by a listing component 735 as described with reference to FIG. 7.

Figure 11:
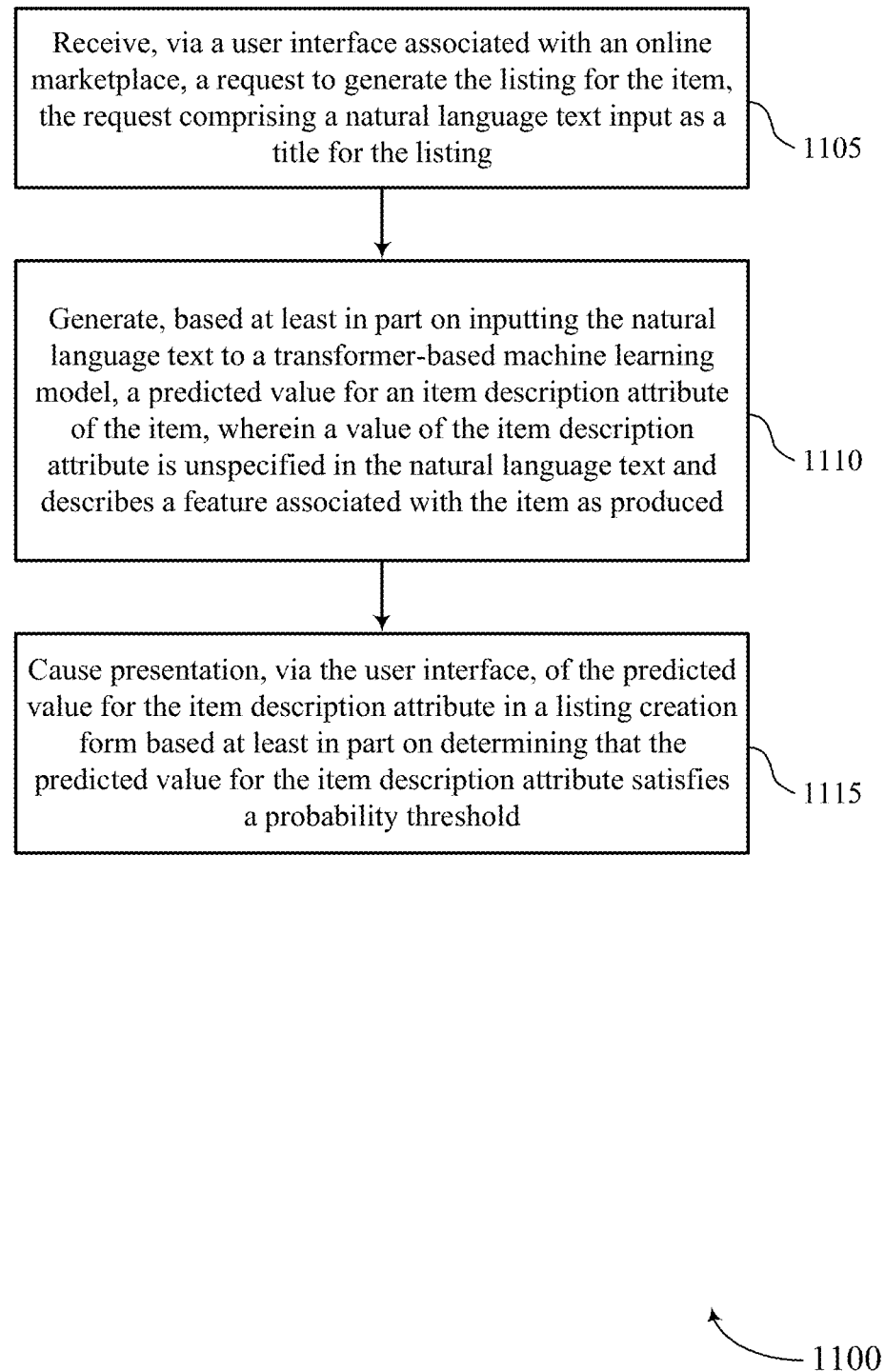

FIG. 11 shows a flowchart illustrating a method 1100 that supports techniques for automatic filling of an input form to generate a listing in accordance with aspects of the present disclosure. The operations of the method 1100 may be implemented by a listing generation component or its components as described herein. For example, the operations of the method 1100 may be performed by a listing generation component as described with reference to FIGS. 1 through 8. In some examples, a listing generation component may execute a set of instructions to control the functional elements of the listing generation component to perform the described functions. Additionally, or alternatively, the listing generation component may perform aspects of the described functions using special-purpose hardware.

At 1105, the method may include receiving, via a user interface associated with an online marketplace, a request to generate the listing for the item, the request including a natural language text input as a title for the listing. The operations of 1105 may be performed in accordance with examples as disclosed herein. In some examples, aspects of the operations of 1105 may be performed by a request component 725 as described with reference to FIG. 7.

At 1110, the method may include generating, based on inputting the natural language text to a transformer-based machine learning model, a predicted value for an item description attribute of the item, where a value of the item description attribute is unspecified in the natural language text and describes a feature associated with the item as produced. The operations of 1110 may be performed in accordance with examples as disclosed herein. In some examples, aspects of the operations of 1110 may be performed by a value generation component 730 as described with reference to FIG. 7.

At 1115, the method may include causing presentation, via the user interface, of the predicted value for the item description attribute in a listing creation form based on determining that the predicted value for the item description attribute satisfies a probability threshold. The operations of 1115 may be performed in accordance with examples as disclosed herein. In some examples, aspects of the operations of 1115 may be performed by a listing component 735 as described with reference to FIG. 7.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A computer-implemented method for generating a listing for an item, the method comprising:

receiving, via a user interface associated with an online marketplace, a request to generate the listing for the item, the request comprising a natural language text input as a title for the listing;

based on the natural language text input, determining a plurality of missing item description attributes that are missing from the natural language text input;

generating, based at least in part on inputting the natural language text to a transformer-based machine learning model, a predicted value for a first missing item description attribute and a predicted value for a second missing item description attribute of the plurality of missing item description attributes, the predicted values being unspecified in the natural language text and describing a feature associated with the item as produced, the generating comprising:

determining a set of possible predicted values for the first missing item description attribute and a set of possible predicted values for the second missing item description attribute;

assigning a probability to each possible predicted value; and selecting the predicted value for the first missing item description attribute and the predicted value for the second missing item description attribute based on the respective predicted value having a highest probability in the set of possible predicted values;

causing presentation of a listing creation form that displays an attribute-predicted value pair corresponding to the first missing item description attribute having the predicted value for the first missing item description attribute, an approve icon to approve the attribute-predicted value pair, and a decline icon to decline the attribute-predicted value pair;

based in part on an indication of a selection of the approve icon, updating the probability of each possible predicted value of the set of possible predicted values for the second missing item description attribute and selecting a new predicted value for the second missing item description attribute based on the updated probability;

generating the listing comprising at least the predicted value for the first missing item description attribute; and causing presentation, via the user interface associated with the online marketplace, of the listing comprising at least the predicted value for the first missing item description attribute.

2. The method of claim 1, wherein generating the predicted value for the first missing item description attribute further comprises:

parsing the natural language text to generate a title token;

identifying an attribute token of the transformer-based machine learning model associated with the item in which an attribute value is unspecified in the natural language text based at least in part on the title token; and applying the transformer-based machine learning model to generate the predicted value for the first missing item description attribute based at least in part on a set of title tokens and the attribute token.

3. The method of claim 1, wherein causing presentation of the predicted value for the first missing item description attribute in the listing creation form is based at least in part on determining that the predicted value for the first missing item description attribute satisfies a probability threshold; and the method further comprises updating a probability value associated with the predicted value for the first missing item description attribute based on the indication of the selection of the approve icon.

4. The method of claim 1, wherein the listing creation form includes a second item description attribute-predicted value pair having the new predicted value for the second missing item description attribute, a second approve icon to approve the second item description attribute-predicted value pair, and a second decline icon to decline the second item description attribute-predicted value pair, the method further comprising:

receiving, via the user interface, an indication of a selection of the second decline icon; and updating a probability value associated with the first new predicted value for the second missing item description attribute based at least in part on the indication of the selection of the second decline icon.

5. The method of claim 4, further comprising:

generating, based at least in part on the transformer-based machine learning model, a second predicted value for the second missing item description attribute in response to receiving the indication of the selection of the second decline icon.

6. The method of claim 1, further comprising:

inputting, to the transformer-based machine learning model, an indication of an attribute field token for the listing;

masking one or more of attribute field values corresponding to the attribute field token; and training the transformer-based machine learning model to predict an attribute field value based at least in part on the attribute field token and natural language training text sample.

7. The method of claim 1, wherein the request to generate the listing for the item is received as an input to the listing creation form displayed on the user interface.

8. An apparatus for generating a listing for an item, the apparatus comprising:

a processor;

memory coupled with the processor; and instructions stored in the memory and executable by the processor to cause the apparatus to perform operations comprising:

receiving, via a user interface associated with an online marketplace, a request to generate the listing for the item, the request comprising a natural language text input as a title for the listing;

based on the natural language text input, determining a plurality of missing item description attributes that are missing from the natural language text input;

generating, based at least in part on inputting the natural language text to a transformer-based machine learning model, a predicted value for a first missing item description attribute and a predicted value for a second missing item description attribute of the plurality of missing item description attributes, the predicted value being unspecified in the natural language text and describing a feature associated with the item as produced, the generating comprising:

determining a set of possible predicted values for the first missing item description attribute and a set of possible predicted values for the second missing item description attribute;

assigning a probability to each possible predicted value; and selecting the predicted value for the first missing item description attribute and the predicted value for the second missing item description attribute based on the respective predicted value having a highest probability in the set of possible predicted values;

causing presentation of a listing creation form that displays an attribute-predicted value pair corresponding to the first missing item description attribute having the predicted value for the first missing item description attribute, an approve icon to approve the attribute-predicted value pair, and a decline icon to decline the attribute-predicted value pair;

based in part on an indication of a selection of the approve icon, updating the probability of each possible predicted value of the set of possible predicted values for the second missing item description attribute and selecting a new predicted value for the second missing item description attribute based on the updated probability;

generating the listing comprising at least the predicted value for the first missing item description attribute; and causing presentation, via the user interface associated with the online marketplace, of the listing comprising at least the predicted value for the first missing item description attribute.

9. The apparatus of claim 8, wherein generating the predicted value for the first missing item description attribute further comprises:

parsing the natural language text to generate a title token;

identifying an attribute token of the transformer-based machine learning model associated with the item in which an attribute value is unspecified in the natural language text based at least in part on the title token; and applying the transformer-based machine learning model to generate the predicted value for the first missing item description attribute based at least in part on a set of title tokens and the attribute token.

10. The apparatus of claim 8, wherein:

causing presentation of the predicted value for the first missing item description attribute in the listing creation form is based at least in part on determining that the predicted value for the first missing item description attribute satisfies a probability threshold; and the operations further comprises updating a probability value associated with the predicted value for the first missing item description attribute based on the indication of the selection of the approve icon.

11. The apparatus of claim 8, wherein the listing creation form includes a second item description attribute-predicted value pair having the new predicted value for the second missing item description attribute, a second approve icon to approve the second item description attribute-predicted value pair, and a second decline icon to decline the second item description attribute-predicted value pair, the operations further comprising:

receiving, via the user interface, an indication of a selection of the second decline icon; and updating a probability value associated with the first new predicted value for the second missing item description attribute based at least in part on the indication of the selection of the second decline icon.

12. The apparatus of claim 11, wherein the operations further comprise:

generating, based at least in part on the transformer-based machine learning model, a second predicted value for the second missing item description attribute in response to receiving the indication of the selection of the second decline icon.

13. The apparatus of claim 8, wherein the operations further comprise:

inputting, to the transformer-base machine learning model, an indication of an attribute field token for the listing;

masking one or more of attribute field values corresponding to the attribute field token; and training the transformer-based machine learning model to predict an attribute field value based at least in part on the attribute field token and natural language training text sample.

14. The apparatus of claim 8, wherein the request to generate the listing for the item is received as an input to the listing creation form displayed on the user interface.

15. A non-transitory computer-readable medium storing code for generating a listing for an item, the code comprising instructions that when executed by a processor cause the processor to perform operations comprising:

receiving, via a user interface associated with an online marketplace, a request to generate the listing for the item, the request comprising a natural language text input as a title for the listing;

based on the natural language text input, determining a plurality of missing item description attributes that are missing from the natural language text input;

generating, based at least in part on inputting the natural language text to a transformer-based machine learning model, a predicted value for a first missing item description attribute and a predicted value for a second missing item description attribute of the plurality of missing item description attributes, the predicted value being unspecified in the natural language text and describing a feature associated with the item as produced, the generating comprising:

determining a set of possible predicted values for the first missing item description attribute and a set of possible predicted values for the second missing item description attribute;

assigning a probability to each possible predicted value; and selecting the predicted value for the first missing item description attribute and the predicted value for the second missing item description attribute based on the respective predicted value having a highest probability in the set of possible predicted values;

causing presentation of a listing creation form that displays an attribute-predicted value pair corresponding to the first missing item description attribute having the predicted value for the first missing item description attribute, an approve icon to approve the attribute-predicted value pair, and a decline icon to decline the attribute-predicted value pair;

based in part on an indication of a selection of the approve icon, updating the probability of each possible predicted value of the set of possible predicted values for the second missing item description attribute and selecting a new predicted value for the second missing item description attribute based on the updated probability;

generating the listing comprising at least the predicted value for the first missing item description attribute; and causing presentation, via the user interface associated with the online marketplace, of the listing comprising at least the predicted value for the first missing item description attribute.

16. The non-transitory computer-readable medium of claim 15, wherein generating the predicted value for the first missing item description attribute further comprises:

parsing the natural language text to generate a title token;

identifying an attribute token of the transformer-based machine learning model associated with the item in which an attribute value is unspecified in the natural language text based at least in part on the title token; and applying the transformer-based machine learning model to generate the predicted value for the first missing item description attribute based at least in part on a set of title tokens and the attribute token.

17. The non-transitory computer-readable medium of claim 15, wherein causing presentation of the predicted value for the first missing item description attribute in the listing creation form is based at least in part on determining that the predicted value for the first missing item description attribute satisfies a probability threshold; and the operations further comprise updating a probability value associated with the predicted value of the first missing item description attribute based on the indication of the selection of the approve icon.

18. The non-transitory computer-readable medium of claim 17, wherein the listing creation form includes a second item description attribute-predicted value pair having the new predicted value for the second missing item description attribute, a second approve icon to approve the second item description attribute-predicted value, and a second decline icon to decline the second item description attribute-predicted value, the operations further comprising:

receiving, via the user interface, an indication of a selection of the second decline icon; and updating a probability value associated with the new predicted value for the second missing item description attribute based at least in part on the indication of the selection of the second decline icon.

19. The non-transitory computer-readable medium of claim 18, wherein the operations further comprise:

generating, based at least in part on the transformer-based machine learning model, a second predicted value for the second missing item description attribute in response to receiving the indication of the selection of the second decline icon.

20. The non-transitory computer-readable medium of claim 15, wherein the operations further comprise:

inputting, to the transformer-base machine learning model, an indication of an attribute field token for the listing;

masking one or more of attribute field values corresponding to the attribute field token; and
training the transformer-based machine learning model to predict an attribute field value based at least in part on the attribute field token and natural language training text sample.

\* \* \* \* \*